US012563533B2

(12) United States Patent
Luo et al.

(10) Patent No.: US 12,563,533 B2
(45) Date of Patent: Feb. 24, 2026

(54) RESOURCE ALLOCATION METHOD, APPARATUS, AND SYSTEM

(71) Applicant: HUAWEI TECHNOLOGIES CO., LTD., Shenzhen (CN)

(72) Inventors: Zhihu Luo, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 18/164,054

(22) Filed: Feb. 3, 2023

(65) Prior Publication Data

US 2023/0189222 A1 Jun. 15, 2023

Related U.S. Application Data

(63) Continuation of application No. PCT/CN2020/107542, filed on Aug. 6, 2020.

(51) Int. Cl.
| | |
|---|---|
| *H04W 72/044* | (2023.01) |
| *H04L 5/00* | (2006.01) |
| *H04W 72/23* | (2023.01) |

(52) U.S. Cl.
CPC ......... *H04W 72/044* (2013.01); *H04L 5/0092* (2013.01); *H04W 72/23* (2023.01)

(58) Field of Classification Search
CPC ............... H04W 72/044; H04W 72/23; H04W 72/0453; H04L 5/0092; H04L 5/0053; H04L 5/001
See application file for complete search history.

(56) References Cited

U.S. PATENT DOCUMENTS

| | | | | |
|---|---|---|---|---|
| 2014/0112283 A1* | 4/2014 | Kim | ..................... | H04W 72/23 |
| | | | | 370/329 |
| 2017/0245313 A1* | 8/2017 | Kim | ..................... | H04L 1/1671 |
| 2019/0021045 A1* | 1/2019 | Kim | ..................... | H04W 72/23 |
| 2019/0140807 A1 | 5/2019 | Wang et al. | | |
| 2019/0297605 A1* | 9/2019 | Kim | ..................... | H04W 72/23 |
| 2019/0297607 A1* | 9/2019 | Kim | ..................... | H04W 72/23 |

(Continued)

FOREIGN PATENT DOCUMENTS

| | | |
|---|---|---|
| CN | 109769300 A | 5/2019 |
| CN | 110324897 A | 10/2019 |

(Continued)

*Primary Examiner* — John D Blanton
(74) *Attorney, Agent, or Firm* — Maier & Maier, PLLC

(57) ABSTRACT

In a resource allocation method, after determining a BWP allocated to a terminal device, where the BWP includes a first BWP, and determining a first value, a network device sends first indication information to the terminal device, where the first indication information is used to indicate the first value. The terminal device determines the BWP allocated by the network device to the terminal device, where the BWP includes the first BWP, and receives the first indication information from the network device. Then, when the first value is used to indicate a RBG size corresponding to the first BWP, the RBG size corresponding to the first BWP is determined based on the first value. Alternatively, when the first value is used to determine a RIV set corresponding to the first BWP, the RIV set corresponding to the first BWP is determined based on the first value.

16 Claims, 15 Drawing Sheets

(56) References Cited

U.S. PATENT DOCUMENTS

| | | | |
|---|---|---|---|
| 2021/0037505 A1* | 2/2021 | Kim ...................... | H04L 5/0094 |
| 2021/0168801 A1* | 6/2021 | Wang .................... | H04W 72/23 |
| 2022/0173951 A1* | 6/2022 | Ji ......................... | H04L 5/0094 |
| 2023/0028762 A1* | 1/2023 | Choi ..................... | H04L 5/0094 |
| 2023/0074086 A1* | 3/2023 | Yi ........................ | H04L 1/1822 |
| 2023/0139455 A1* | 5/2023 | Chatterjee ............. | H04W 72/23 |
| | | | 370/329 |
| 2023/0189222 A1* | 6/2023 | Luo ....................... | H04L 5/001 |
| | | | 370/329 |

FOREIGN PATENT DOCUMENTS

| | | | |
|---|---|---|---|
| CN | 110769508 A | 2/2020 | |
| CN | 111294958 A | 6/2020 | |
| WO | 2018232284 A1 | 12/2018 | |

* cited by examiner

RESOURCE ALLOCATION METHOD, APPARATUS, AND SYSTEM

CROSS-REFERENCE TO RELATED APPLICATIONS

This application is a continuation of International Application No. PCT/CN2020/107542, filed on Aug. 6, 2020, the disclosure of which is hereby incorporated by reference in its entirety.

TECHNICAL FIELD

The embodiments relate to the field of communication, a resource allocation method, an apparatus, and a system.

BACKGROUND

In a new radio (NR) system, a base station may configure one or more bandwidth parts (BWP) for a terminal. A BWP includes one or more contiguous physical resource blocks (PRB) in frequency domain.

In BWP-based uplink/downlink resource allocation, there are two resource allocation manners: a resource allocation type 0 (a type 0 for short hereinafter) and a resource allocation type 1 (a type 1 for short hereinafter). As shown in FIG. 1a, for the type 0, a BWP is divided into one or more resource block groups (RBG). A base station may schedule resources at a per-RBG granularity, and allocate some or all of RBGs in a BWP to a terminal. As shown in FIG. 1B, for the type 1, a base station may indicate, to a terminal by using a resource indication value (RIV), an identifier of a starting virtual resource block (VRB) that is allocated to the terminal and that is in a BWP and a quantity of contiguous VRBs. A VRB is logically a virtual resource block (RB) and needs to be mapped to a PRB finally.

Based on the two resource allocation manners, when BWPs configured by a base station for a narrowband terminal and a wideband terminal overlap, there may be a problem that a resource not scheduled to the narrowband terminal cannot be scheduled to the wideband terminal, resulting in generation of a resource fragment and a waste of resources.

SUMMARY

The embodiments may provide a resource allocation method, an apparatus, and a system, to reduce a waste of resources and improve resource utilization.

To achieve the foregoing objectives, the following solutions are used in the embodiments.

According to a first aspect, a resource allocation method is provided. In the solution, a network device determines a bandwidth part allocated to a terminal device, where the bandwidth part includes a first bandwidth part; the network device determines a first value, where the first value is used to indicate a resource block group RBG size corresponding to the first bandwidth part, or the first value is used to determine a resource indication value RIV set corresponding to the first bandwidth part; and the network device sends first indication information to the terminal device, where the first indication information is used to indicate the first value.

Based on the solution, compared with that the RBG size corresponding to the first BWP is determined by searching a table in the conventional technology, in this embodiment, the RBG size corresponding to the first BWP may be controlled by the network device by using the first value. The network device may flexibly adjust the RBG size corresponding to the first BWP, so that some RBGs in the first BWP are aligned with some RBGs in a second BWP, reducing occurrence of a case in which an RBG in the second BWP includes an RBG in the first BWP, further reducing generation of a resource fragment, and improving resource utilization.

Alternatively, compared with the conventional technology, in this embodiment, the network device may control, by using the first value, an RIV in the RIV set corresponding to the first BWP, so that a starting VRB in a VRB set determined based on the RIV in the RIV set is aligned with a starting or ending VRB in an RBG in a second BWP, and/or an ending VRB in the VRB set is aligned with a starting or ending VRB in an RBG in the second BWP. Subsequently, the network device may indicate the RIV in the RIV set to the terminal device, so that the starting VRB and/or ending VRB in the VRB set allocated to the terminal device in the first BWP meet/meets the foregoing alignment requirements/requirement, reducing occurrence of a case in which an RBG in the second BWP includes the VRB set in the first BWP, further reducing generation of a resource fragment, and improving resource utilization.

The first value may be equal to an RBG size corresponding to the second bandwidth part, the second bandwidth part may include at least one part of the first bandwidth part, and a size of the second bandwidth part may be greater than a size of the first bandwidth part.

The first value may be equal to an RBG size corresponding to the second bandwidth part, the first bandwidth part may include at least one part of the second bandwidth part, and a size of the first bandwidth part may be greater than a size of the second bandwidth part.

Some RBGs in the first BWP can be aligned with some RBGs in the second BWP, reducing occurrence of a case in which an RBG in the second BWP includes an RBG in the first BWP, further reducing generation of a resource fragment, and improving resource utilization.

The resource allocation method may further include: The network device sends second indication information to the terminal device. When the first value is used to indicate the RBG size corresponding to the first bandwidth part, the second indication information is used to indicate a first RBG, where the first RBG is an RBG that is allocated to the terminal device and that is in the first bandwidth part. When the first value is used to determine the RIV set corresponding to the first bandwidth part, the second indication information is used to indicate a first RIV in the RIV set, where the first RIV is used to determine the virtual resource block (VRB) set that is allocated to the terminal device and that is in the first bandwidth part.

The terminal device may determine a resource allocated to the terminal device, and therefore, may use the resource for transmission.

The second indication information may be carried by a first field and a bit quantity of the first field may be determined based on the first value.

Compared with the conventional technology, because the RBG size corresponding to the first BWP increases, a total RBG quantity of the first BWP decreases, and therefore, the bit quantity of the first field decreases accordingly, reducing signaling overheads.

When the first value is used to determine the resource indication value RIV set corresponding to the first bandwidth part, the VRB set determined based on the RIV in the RIV set may meet one or more of the following:

$$(N_{BWP}^{start}+RB_{start}) \bmod K=0 \text{ or } (N_{BWP}^{start}+RB_{start}+L_{RBs}) \bmod K=0,$$

where K is the first value, $RB_{start}$ is an index value of the starting VRB in the VRB set, $L_{RBs}$ is a quantity of VRBs included in the VRB set, and $N_{BWP}^{start}$ is a number of a CRB corresponding to a starting PRB in the first BWP.

The starting VRB included in the VRB set in the first BWP may be controlled, by using $N_{BWP}^{start}+RB_{start})$ mod K=0, to be aligned with a starting or ending VRB in an RBG in the second BWP; and the ending VRB included in the VRB set can be controlled, by using $(N_{BWP}^{start}+RB_{start}+L_{RBs})$ mod K=0, to be aligned with a starting or ending VRB in an RBG in the second BWP, reducing occurrence of a case in which an RBG in the second BWP includes the VRB set in the first BWP, further reducing generation of a resource fragment, and improving resource utilization.

The bandwidth part may further include a third bandwidth part; and the first value may be further used to indicate an RBG size corresponding to the third bandwidth part, or the first value may be further used to determine an RIV set corresponding to the third bandwidth part.

For a plurality of BWPs of the terminal device, the network device may indicate, by using one value, RBG sizes corresponding to the plurality of BWPs, reducing signaling overheads used for indicating, to the terminal device, the RBG sizes corresponding to the plurality of BWPs. Alternatively, for a plurality of BWPs of the terminal device, the network device can indicate, by using one value, RIV sets corresponding to the plurality of BWPs, with no need to separately send, to the terminal device, values used for determining the RIV sets corresponding to the BWPs, further reducing signaling overheads.

The network device may send a system message to the terminal device, where the system message includes the first indication information; or the network device may send radio resource control (RRC) signaling to the terminal device, where the RRC signaling includes the first indication information; or the network device sends a media access control control element (MAC CE) to the terminal device, where the MAC CE includes the first indication information; or the network device sends downlink control information DCI to the terminal device, where the DCI includes the first indication information.

The network device may send the first indication information to the terminal device by using higher layer signaling (for example, the RRC signaling or the MAC CE) or the network device may send the first indication information to the terminal device by using physical layer signaling (for example, the DCI).

According to a second aspect, a resource allocation method is provided. In the method, a terminal device determines a bandwidth part allocated by a network device to the terminal device, where the bandwidth part includes a first bandwidth part; the terminal device receives first indication information from the network device, where the first indication information is used to indicate a first value; and the terminal device determines, based on the first value, a resource block group RBG size corresponding to the first bandwidth part, or the terminal device determines, based on the first value, a resource indication value RIV set corresponding to the first bandwidth part. For effects brought by the second aspect, refer to the effects brought by the first aspect. Details are not described herein again.

The first value may be equal to an RBG size corresponding to a second bandwidth part, the second bandwidth part may include at least one part of the first bandwidth part, and a size of the second bandwidth part may be greater than a size of the first bandwidth part.

The resource allocation method may further include: The terminal device receives second indication information from the network device; and the terminal device determines, based on the RBG size corresponding to the first bandwidth part and the second indication information, a first RBG indicated by the second indication information as an RBG that is allocated to the terminal device and that is in the first bandwidth part, or the terminal device determines, based on the RIV set corresponding to the first bandwidth part and the second indication information, a VRB set corresponding to a first RIV that is indicated by the second indication information, as a VRB set that is allocated to the terminal device and that is in the first bandwidth part.

The second indication information may be carried by a first field and a bit quantity of the first field may be determined based on the first value.

The VRB set determined based on the RIV in the RIV set may meet one or more of the following:

$$(N_{BWP}^{start}+RB_{start})\text{mod } K=0 \text{ or } (N_{BWP}^{start}+RB_{start}+L_{RBs})\text{mod } K=0,$$

where K is the first value, $RB_{start}$ is an index value of a starting VRB in the VRB set, $L_{RBs}$ is a quantity of VRBs included in the VRB set, and $N_{BWP}^{start}$ is a number of a CRB corresponding to a starting PRB in the first BWP.

The resource allocation method may further include: The terminal device determines, based on the first value, an RBG size corresponding to a third bandwidth part; or the terminal device determines, based on the first value, an RIV set corresponding to a third bandwidth part.

The terminal device may receive a system message from the network device, where the system message includes the first indication information; or the terminal device receives radio resource control (RRC) signaling from the network device, where the RRC signaling includes the first indication information; or the terminal device receives a media access control control element (MAC CE) from the network device, where the MAC CE includes the first indication information; or the terminal device receives downlink control information DCI from the network device, where the DCI includes the first indication information.

According to a third aspect, a communication apparatus is provided and configured to implement the foregoing methods. The communication apparatus may be the network device in the first aspect, or an apparatus including the network device, or an apparatus included in the network device, for example, a chip. Alternatively, the communication apparatus may be the terminal device in the second aspect, or an apparatus including the terminal device, or an apparatus included in the terminal device, for example, a chip. The communication apparatus includes corresponding modules, units, or means that implement the foregoing methods. The modules, units, or means may be implemented by hardware, by software, or by hardware executing corresponding software. The hardware or the software includes one or more modules or units corresponding to the foregoing functions.

According to a fourth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the network device in the first aspect, or an apparatus including the network device, or an apparatus included in the network device, for example, a chip. Alternatively, the communication apparatus may be the terminal device in the second aspect, or an apparatus including the terminal device, or an apparatus included in the terminal device, for example, a chip.

According to a fifth aspect, a communication apparatus is provided. The communication apparatus includes a processor. The processor is configured to be coupled to a memory, and after reading instructions in the memory, perform the method according to any one of the foregoing aspects based on the instructions. The communication apparatus may be the network device in the first aspect, or an apparatus including the network device, or an apparatus included in the network device, for example, a chip. Alternatively, the communication apparatus may be the terminal device in the second aspect, or an apparatus including the terminal device, or an apparatus included in the terminal device, for example, a chip.

According to a sixth aspect, a non-transitory computer-readable storage medium is provided. The non-transitory computer-readable storage medium stores instructions. When the instructions are run on a computer, the computer is enabled to perform the method according to any one of the foregoing aspects.

According to a seventh aspect, a computer program product including instructions is provided. When the computer program product is run on a computer, the computer is enabled to perform the method according to any one of the foregoing aspects.

According to an eighth aspect, a communication apparatus is provided. The communication apparatus includes an interface circuit and at least one processor. The interface circuit may be a code/data read-write interface circuit. The interface circuit is configured to receive computer-executable instructions (the computer-executable instructions are stored in a memory, may be read directly from the memory, or by using another device) and transmit the computer-executable instructions to the processor. The processor is configured to run the computer-executable instructions to perform the method according to any one of the foregoing aspects. The communication apparatus may be the network device in the first aspect, or an apparatus including the network device, or an apparatus included in the network device, for example, a chip. Alternatively, the communication apparatus may be the terminal device in the second aspect, or an apparatus including the terminal device, or an apparatus included in the terminal device, for example, a chip.

According to a ninth aspect, a communication apparatus is provided (for example, the communication apparatus may be a chip or a chip system). The communication apparatus includes a processor, configured to implement functions in any one of the foregoing aspects. The communication apparatus may further include the memory and the memory may be configured to store necessary program instructions and data. When the communication apparatus is a chip system, the communication apparatus may include a chip, or may include a chip and another discrete device.

For effects brought by the third aspect to the ninth aspect, refer to the effects brought by the first aspect or the second aspect. Details are not described herein again.

According to a tenth aspect, a communication system is provided. The communication system includes the terminal device according to the foregoing aspects and the network device according to the foregoing aspects.

Figure 1A:
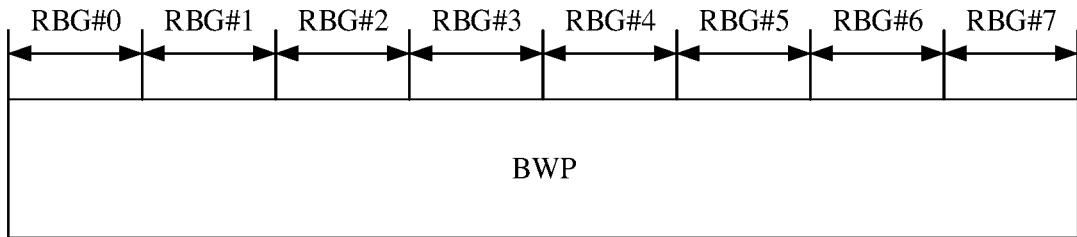
FIG. 1a is a schematic diagram of a resource allocation type 0.
Figure 1B:
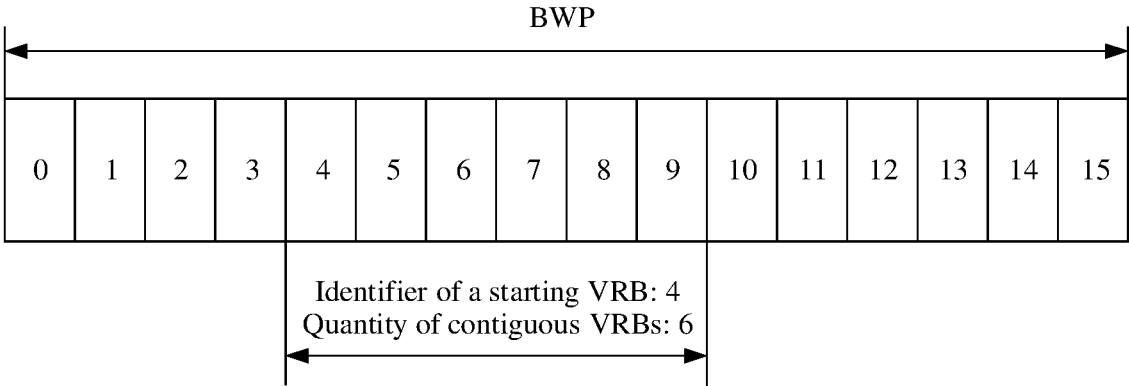
FIG. 1b is a schematic diagram of a resource allocation type 1.

DETAILED DESCRIPTION OF THE
EMBODIMENTS

For ease of understanding the embodiments, brief descriptions or definitions of relevant technologies are first provided as follows:

1. Subcarrier and Subcarrier Spacing

Subcarrier: In an orthogonal frequency division multiplexing (OFDM) system, a frequency domain resource is divided into several sub-resources. Each sub-resource in frequency domain may be referred to as a subcarrier. The subcarrier may also be considered as a minimum granularity of the frequency domain resource.

Subcarrier spacing: A subcarrier spacing is a value of a spacing between center positions or peak positions of two adjacent subcarriers in frequency domain. For example, a subcarrier spacing in a long term evolution (LTE) system is 15 kilohertz (kHz), and a subcarrier spacing in an NR system is 15 kHz, 30 kHz, 60 kHz, 120 kHz, 240 kHz, or the like.

The subcarrier spacing in the NR system may be configured by using a network device. For example, a subcarrier spacing configuration $\mu=0$ corresponds to a subcarrier spacing of 15 kHz, a subcarrier spacing configuration $\mu=1$ corresponds to a subcarrier spacing of 30 kHz, a subcarrier spacing configuration $\mu=2$ corresponds to a subcarrier spacing of 60 kHz, a subcarrier spacing configuration $\mu=3$ corresponds to a subcarrier spacing of 120 kHz, a subcarrier spacing configuration $\mu=4$ corresponds to a subcarrier spacing of 240 kHz, or the like.

2. Resource Block, Physical Resource Block, Virtual Resource Block, Point a, and Common Resource Block Resource block (RB): N contiguous subcarriers in frequency domain may be referred to as one RB. For example, one RB in an LTE system and an NR system includes 12 subcarriers. As a communication system evolves, a quantity of subcarriers included in one RB may alternatively be another value.

Physical resource block (PRB): A PRB may be understood as a concept of physical frequency domain resources used in allocation of frequency domain resources.

Virtual resource block (VRB): A VRB may be understood as a concept of logical frequency domain resources used in allocation of frequency domain resources.

It should be noted that a VRB is logically a virtual RB, and needs to be mapped to a PRB finally. A VRB is mapped to a PRB in two manners: interleaving and non-interleaving. In the non-interleaving manner, the VRB is the same as the PRB. In the interleaving manner, the VRB is mapped to the PRB according to a rule. In this case, contiguous VRBs are not necessarily mapped to contiguous PRBs finally. For mapping from a VRB to a PRB, refer to an existing technology in NR. Details are not described herein.

Point A: A point A is a common reference point used to indicate a resource block. A location of the point A is configured by a network device.

Common resource block (CRB): For a subcarrier spacing configuration μ, CRBs are numbered sequentially in ascending order of frequency from 0. For the subcarrier spacing configuration μ, the point A corresponds to a center position of a subcarrier 0 of a CRB 0. Therefore, when the location of the point A is determined, a location of a CRB is determined. For a relationship between a PRB number and a CRB number, refer to an existing technology in NR. Details are not described herein.

It should be noted that "number", "index", and "identifier" in the embodiments may be replaced with each other. They are all described herein and details are not described again in the following embodiments.

3. Bandwidth Part (BWP)

A BWP includes one or more contiguous PRBs in frequency domain. The BWP is a subset of a bandwidth of a terminal, with a minimum granularity of one PRB. In other words, the PRB may represent an RB in the BWP, and an RB at a lowest frequency in the BWP is numbered first. PRBs included in each BWP are numbered from 0. VRBs included in each BWP are also numbered from 0.

Figure 2:
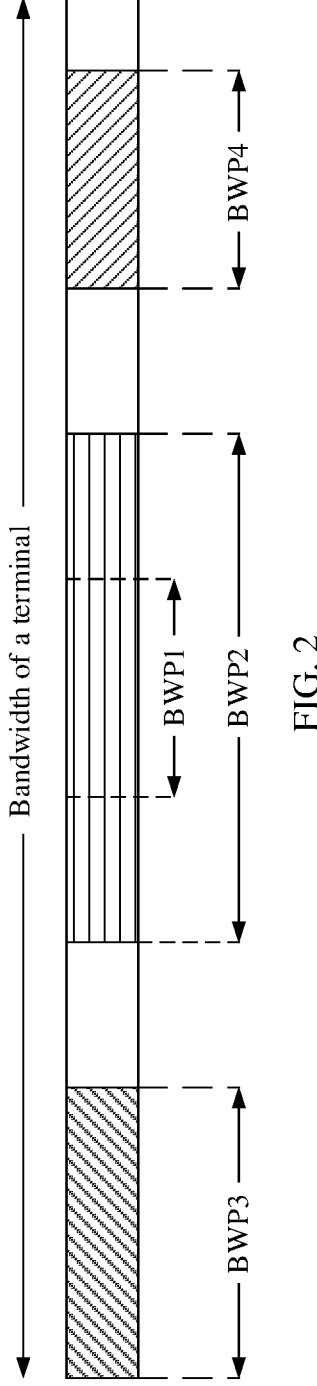
FIG. 2 is a schematic diagram of bandwidth part allocation.

In addition, a network device may configure one or more BWPs for a terminal. The plurality of BWPs may overlap in the frequency domain. For example, as shown in FIG. 2, a network device configures four BWPs for a terminal. A BWP1 and a BWP2 overlap.

It should be noted that at a same time, a terminal device is allowed to operate in only one BWP, or to activate only one BWP for transmission.

It should be noted that "bandwidth part" in the embodiments may also be referred to as "bandwidth region", and the two may be replaced with each other. In addition, in the following embodiments, the BWP is used to represent a bandwidth part, and a size of a BWP is a quantity of PRBs (or RBs) included in the BWP. They are all described herein, and details are not described again in the following embodiments.

4. NR Resource Allocation Manner

The following uses a downlink resource allocation manner as an example for description.

4.1. Downlink Resource Allocation Type 0 (a Type 0 for Short Hereinafter)

For the type 0, a BWP is divided into one or more resource block groups (RBG). The RBG is a group of contiguous VRBs. A size of each RBG, or a quantity of VRBs included in each RBG, is determined based on a size of the BWP. An index of an RBG starts from a lowest frequency of the BWP, and RBGs are numbered in ascending order of frequency.

It should be noted that in the embodiments, a size of an RBG is a quantity of VRBs included in the RBG.

For example, a relationship between a BWP size and a nominal RBG size is shown in Table 1 below. P is the nominal RBG size. A network device may notify a terminal device to use a configuration 1 or a configuration 2.

The nominal RBG size may be understood as sizes of other RBGs other than a first RBG and a last RBG in a BWP. Sizes of the first RBG and the last RBG are less than or equal to the nominal RBG size.

TABLE 1

| BWP size | P (Configuration 1) | P (Configuration 2) |
|---|---|---|
| 1-36 | 2 | 4 |
| 37-72 | 4 | 8 |
| 73-144 | 8 | 16 |
| 145-275 | 16 | 16 |

After determining a BWP that is currently in use, the terminal device may determine a size of each RBG in the BWP according to Table 1. An example is provided as follows:

If a size of the BWP is $N_{BWP}^{size}$, that is, the BWP includes $N_{BWP}^{size}$ PRBs, a total quantity $N_{RBG}$ of RBGs in the BWP meets:

$$N_{RBG} = \lceil (N_{BWP}^{size} + (N_{BWP}^{start} \bmod P))/P \rceil$$

where P is determined by searching Table 1 based on the size of the BWP; $N_{BWP}^{start}$ is a number of a CRB corresponding to a starting PRB in the BWP; mod indicates a modulo operation; and $\lceil \ \rceil$ indicates rounding-up.

In the $N_{RBG}$ RBGs:

a size $RBG_0^{size}$ of a first RBG meets: $RBG_0^{size} = P - N_{BWP}^{start} \bmod P$;

a size of a last RBG meets: if $(N_{BWP}^{size} + N_{BWP}^{start}) \bmod P > 0$ the size $RBG_{last}^{size}$ of the last RBG is: $RBG_{last}^{size} = (N_{BWP}^{size} + N_{BWP}^{start}) \bmod P$; otherwise, the size of the last RBG is P; and sizes of other RBGs other than the first RBG and the last RBG are all P.

After determining the size of each RBG in the BWP, the terminal device may determine, based on downlink control information (DCI), RBGs in the BWP that are scheduled by the network device.

In the DCI, a bitmap with a size of $N_{RBG}$ is used to indicate the RBGs scheduled by the network device. Each bit in the bitmap corresponds to one RBG.I In the bitmap, a most significant bit (MSB) may correspond to the RBG0, a least significant bit (LSB) may correspond to the last RBG, and so on. In addition, when the network device schedules an RBG for the terminal device, a bit corresponding to an RBG in the bitmap is set to 1. When an RBG is not scheduled by the network device, a bit corresponding to the RBG in the bitmap is set to 0.

The following uses an example to describe the resource allocation manner.

For example, a bandwidth of the BWP is 50 PRBs, that is, $N_{BWP}^{size}=50$, $N_{BWP}^{start}=24$, and the configuration 1 is used.

(1) It is determined according to Table 1 that P=4.

(2) A total quantity of RBGs:

$$N_{RBG}=\lceil(N_{BWP}^{size}+(N_{BWP}^{start} \bmod P))/P\rceil=$$
$$\lceil(50+(24 \bmod 4))/4\rceil=13;$$

a size of a first RBG: $RBG_0^{size}=P-N_{BWP}^{start} \bmod P=4-24 \bmod 4=4$;

a size of a last RBG: $RBG_{last}^{size}=(N_{BWP}^{size}+N_{BWP}^{start}) \bmod P=(50+24) \bmod 4=2$; and sizes of other RBGs are 4.

That is, a correspondence between an RBG and VRBs is shown in Table 2 below.

TABLE 2

| RBG | VRB |
|---|---|
| 0 | 0, 1, 2, 3 |
| 1 | 4, 5, 6, 7 |
| 2 | 8, 9, 10, 11 |
| 3 | 12, 13, 14, 15 |
| 4 | 16, 17, 18, 19 |
| 5 | 20, 21, 22, 23 |
| 6 | 24, 25, 26, 27 |
| 7 | 28, 29, 30, 31 |
| 8 | 32, 33, 34, 35 |
| 9 | 36, 37, 38, 39 |
| 10 | 40, 41, 42, 43 |
| 11 | 44, 45, 46, 47 |
| 12 | 48, 49 |

(3) A length of the bitmap in the DCI is equal to the total quantity of RBGs and is 13.

Figure 3:
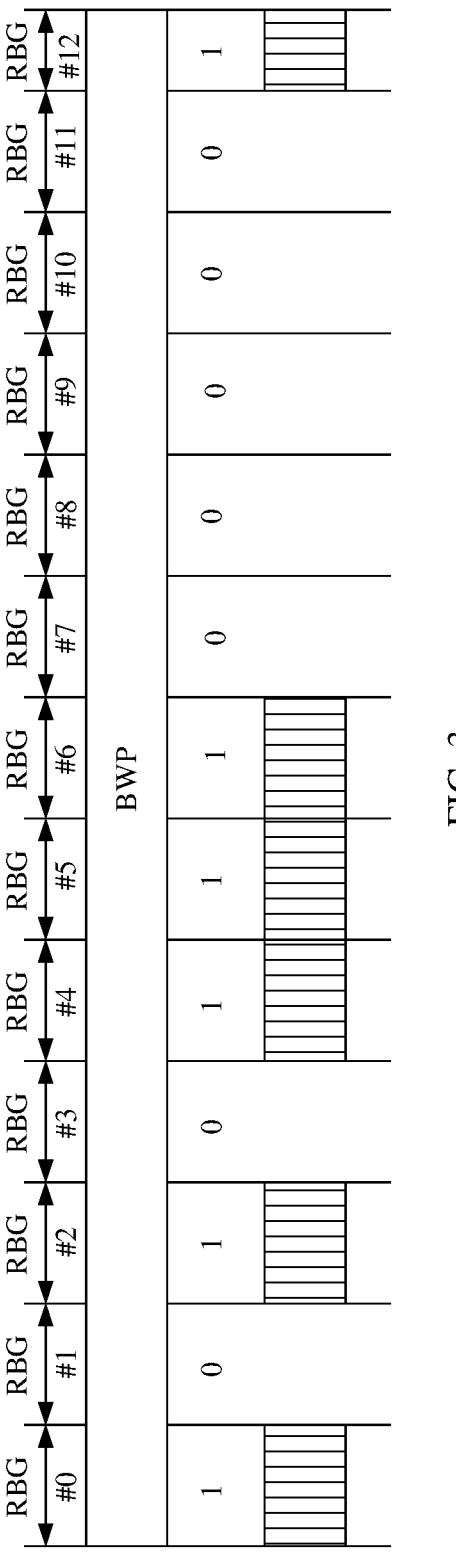
FIG. 3 is a schematic diagram of a resource allocation type 0.

(4) It is assumed that the bitmap is 1010111000001. That is, the network device allocates an RBG0, an RBG2, an RBG4, an RBG5, an RBG6, and an RBG12 to the terminal device. For example, as shown in FIG. 3, boxes filled with vertical lines are the RBGs scheduled by the network device.

In conclusion, for the type 0, resources are scheduled at a per-RBG granularity, and allocation of non-contiguous VRBs in frequency domain is supported. It should be noted that the type 0 can also support allocation of contiguous VRBs in frequency domain. For example, a plurality of consecutive bits in the bitmap are set to 1.

4.2. Downlink Resource Allocation Type 1 (a Type 1 for Short Hereinafter)

In the type 1, a base station may allocate one VRB or a plurality of contiguous VRBs in a BWP to a terminal device. A network device may add a resource indication value (RIV) to a resource allocation field in DCI. Based on the RIV, the following can be derived: an identifier ($RB_{start}$) of a starting VRB allocated to the terminal device and a quantity ($L_{RBs}$) of contiguous VRBs.

In the DCI, a quantity of bits occupied by the RIV is: $\lceil \log_2(N_{RB}^{DL,BWP}(N_{RB}^{DL,BWP}+1)/2) \rceil$, where $N_{RB}^{DL,BWP}$ is a size of a downlink activated BWP, that is, a quantity of PRBs included in the BWP. It may be understood that $N_{RB}^{DL,BWP}$ and $N_{BWP}^{size}$ are equal.

The RIV is defined as follows:

if $L_{RBs}-1 \leq \lfloor N_{BWP}^{size}/2 \rfloor$, $RIV=N_{BWP}^{size}(L_{RBs}-1)+RB_{start};$ otherwise, $RIV=N_{BWP}^{size}(N_{BWP}^{size}-L_{RBs}+1)+ (N_{BWP}^{size}-1-RB_{start}),$ where $1 \leq L_{RBs} \leq N_{BWP}^{size}-RB_{start}$, and $\lfloor \ \rfloor$ indicates rounding-down.

For example, a bandwidth of the BWP is 25 PRBs, an index $RB_{start}$ of the starting VRB is 3, and the quantity $L_{RBs}$ of contiguous VRBs is 10.

A quantity of bits occupied by an RIV field in the DCI for downlink scheduling is: $\lceil \log_2(N_{RB}^{DL,BWP}(N_{RB}^{DL,BWP}+1)/2) \rceil=9$.

Because $L_{RBs}-1=9 \leq \lfloor N_{BWP}^{size}/2 \rfloor=12$, $RIV=N_{BWP}^{size}(L_{RBs}-1)+RB_{start}=25 \times (10-1)+3=228$.

Figure 4:
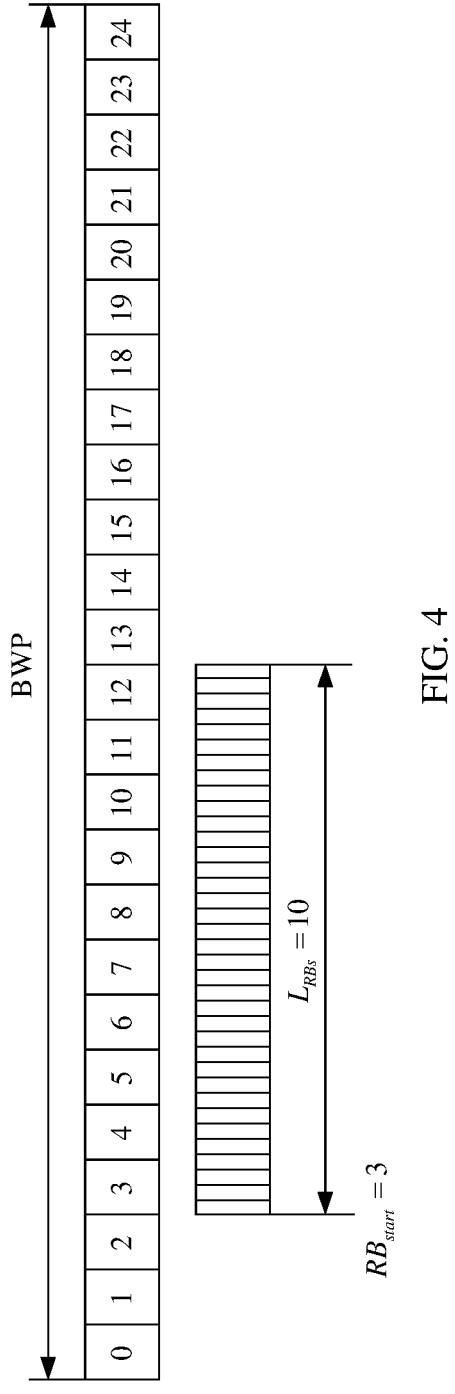
FIG. 4 is a schematic diagram of a resource allocation type 1.

After the terminal device receives the RIV, a possible implementation in which the terminal device determines $RB_{start}$ and $L_{RBs}$ based on the RIV is as follows:

if $\lfloor RIV/N_{BWP}^{size} \rfloor+RIV \bmod N_{BWP}^{size}<N_{BWP}^{size}$, $RB_{start}=RIV \bmod N_{BWP}^{size}, L_{RBs}=\lfloor RIV/N_{BWP}^{size} \rfloor+1;$
   or if $\lfloor RIV/N_{BWP}^{size} \rfloor+RIV \bmod N_{BWP}^{size} \geq N_{BWP}^{size}$, $RB_{start}=N_{BWP}^{size}-RIV \bmod N_{BWP}^{size}-1,$
   $L_{RBs}=N_{BWP}^{size}-\lfloor RIV/N_{BWP}^{size} \rfloor+1.$ Based on the foregoing example, after receiving the RIV, the terminal device can determine based on the implementation that the index $RB_{start}$ of the starting VRB is 3 and the quantity $L_{RBs}$ contiguous VRBs is 10, as shown in FIG. 4.

In conclusion, the type 1 supports allocation of contiguous VRBs in frequency domain. Different from the type 0 that has a scheduling granularity of an RBG, the type 1 may have a scheduling granularity of a VRB (or an RB).

In addition, an uplink type 0 and an uplink type 1 are similar to the downlink type 0 and the downlink type 1, respectively. Only replacing a downlink parameter with an uplink parameter is required. Therefore, details are not described herein again.

Currently, a terminal device in an NR system has a large operating bandwidth and may be referred to as a wideband terminal or a wideband terminal device. For a frequency band 1 (FR1), a maximum operating bandwidth of the terminal device may reach 100 megahertz (MHz). For a frequency band 2 (FR2), the maximum operating bandwidth of the terminal device may reach 400 MHz.

However, the wideband terminal has high costs and is not suitable to be used in an internet of things application with relatively low costs. Therefore, a narrowband terminal is introduced in NR. That is, the terminal device has a small operating bandwidth. However, when the narrowband terminal and the wideband terminal coexist and BWPs configured by a network device for the narrowband terminal and the wideband terminal overlap, if in a scheduling, RBGs or VRBs scheduled by the network device to the narrowband terminal are the same as some VRBs in an RBG configured for the wideband terminal, the some VRBs in the RBG configured for the wideband terminal are scheduled to the narrowband terminal. Because scheduling is performed on a per-RBG granularity in the type 0, the network device cannot schedule the RBG configured for the wideband terminal to the wideband terminal. As a result, other RBGs not scheduled to the narrowband terminal in the RBG configured for the wideband terminal cannot be scheduled to the wideband terminal. In other words, it may result in a problem that a resource not scheduled to the narrowband terminal cannot be scheduled to the wideband terminal, causing a waste of resources.

For example, it is assumed that a terminal 1 is a narrowband terminal, a size of a BWP1 allocated by the network device to the terminal 1 is 25 PRBs, a terminal 2 is a wideband terminal, a size of a BWP2 allocated by the network device to the terminal 2 is 270 PRBs, and the BWP1 and BWP2 have a same starting frequency. The following scenarios are considered.

Scenario 1: The type 0 is used for resource allocation of both the terminal 1 and the terminal 2.

It is assumed that the network device performs configuration according to the configuration 1 for both the terminal 1 and the terminal 2. According to Table 1 described above, a nominal RBG size corresponding to the BWP1 is 2, and a nominal RBG size corresponding to the BWP2 is 16. In this case, division of RBGs corresponding to the BWP1 and division of RBGs corresponding to the BWP2 may be shown in FIG. 5a. It may be understood that FIG. 5a shows only some RBGs in the BWP2.

Figure 5A:
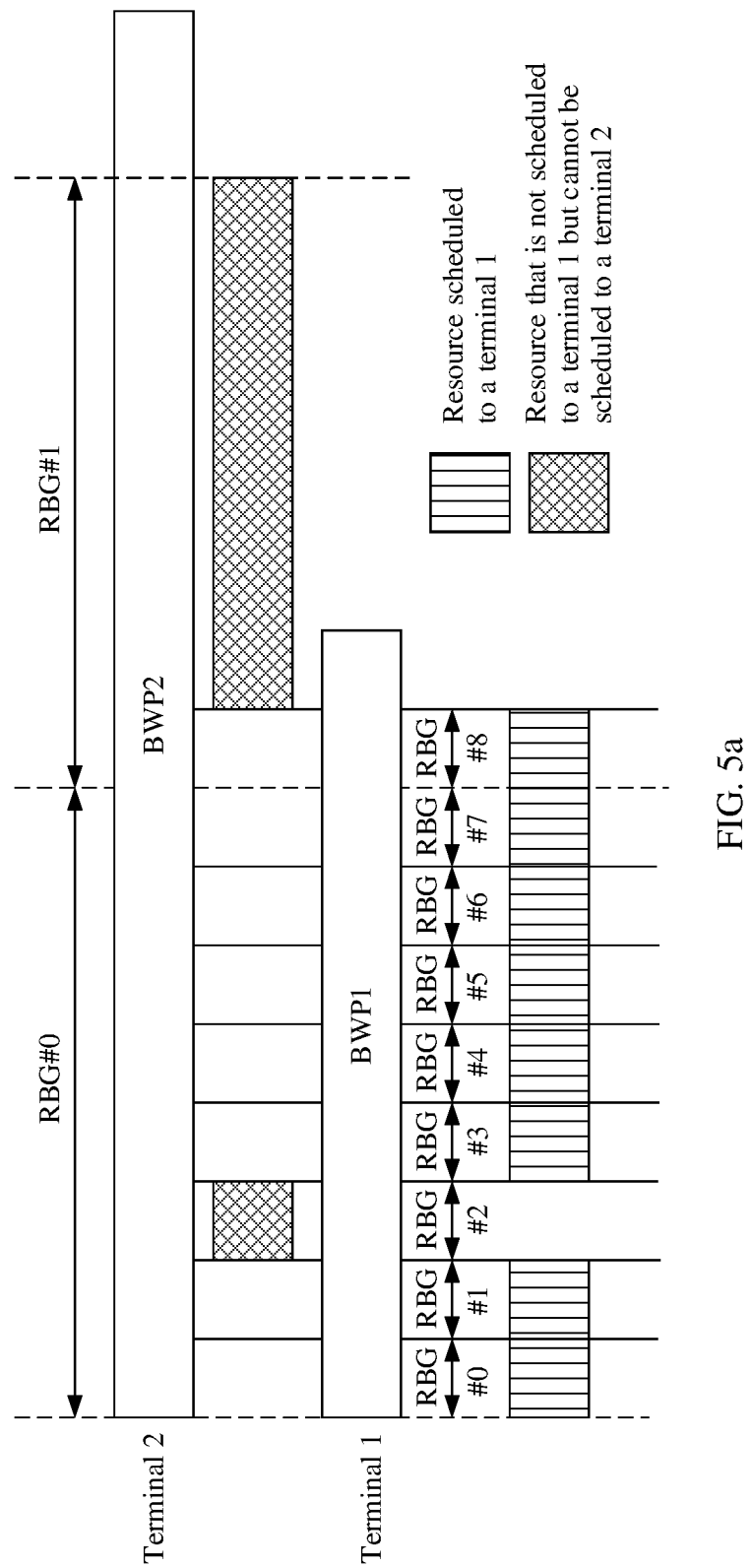
FIG. 5a is a schematic diagram of a resource allocation when BWPs allocated to a narrowband terminal and a wideband terminal overlap.

Based on FIG. 5a, if the network device schedules an RBG0, an RBG1, an RBG3, an RBG4, an RBGS, an RBG6, an RBG7, and an RBG8 in the BWP1 to the terminal 1, in this case, an RBG2 in the BWP1 is not scheduled to the terminal 1. However, because the RBG0, the RBG1, the RBG3, the RBG4, the RBG5, the RBG6, and the RBG7 in the BWP1 are scheduled to the terminal 1, these RBGs are the same as some VRBs in an RBG0 in the BWP2, and the network device cannot schedule a same VRB to different terminals at a same time, the RBG0 in the BWP2 cannot be scheduled to the terminal 2. As a result, the RBG2 in the BWP1 is neither scheduled to the terminal 1 nor can be scheduled to the terminal 2, and becomes a resource fragment. Likewise, a VRB not scheduled to the terminal 1 in an RBG1 in the BWP2 is also a resource fragment. These resource fragments are not used, causing a waste of resources.

Scenario 2: The terminal 1 uses the type 1 for allocation of downlink resources, and the terminal 2 uses the type 0 for allocation of downlink resources.

For the terminal 2, it is assumed that the network device performs configuration according to the configuration 1. According to Table 1 described above, a nominal RBG size corresponding to the BWP2 is 16.

Figure 5B:
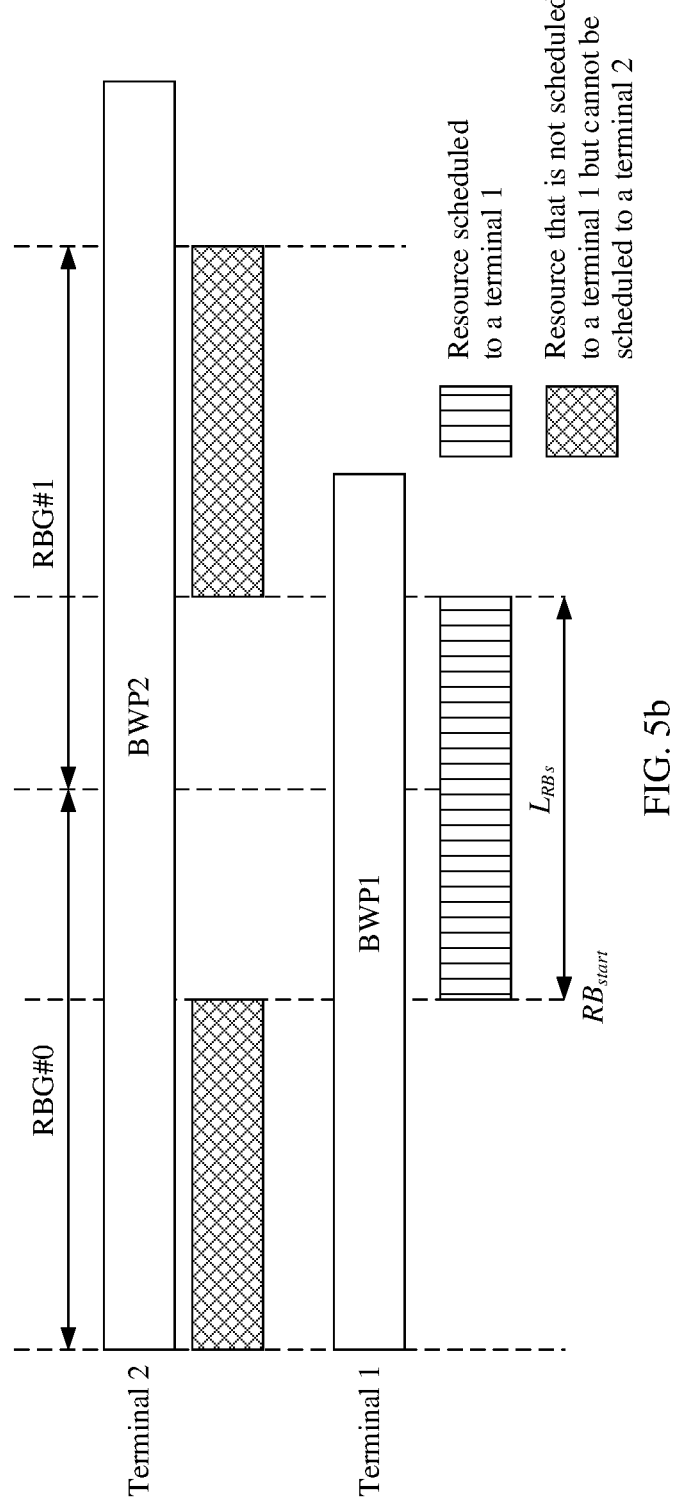
FIG. 5b is a schematic diagram of another resource allocation when BWPs allocated to a narrowband terminal and a wideband terminal overlap.

It is assumed that a starting VRB that is in the BWP1 and that is scheduled by the network device to the terminal 1 is the same as a VRB in an RBG0 in the BWP2, and a last VRB that is in the BWP1 and that is scheduled by the network device to the terminal 1 is the same as a VRB in an RBG1 in the BWP2, as shown in FIG. 5b. Some VRBs in the RBG0 in the BWP2 are scheduled to the terminal 1. Therefore, the RBG0 cannot be scheduled to the terminal 2. As a result, VRBs not scheduled to the terminal 1 in the RBG0 also cannot be scheduled to the terminal 2. Likewise, a VRB not scheduled to the terminal 1 in the RBG1 in the BWP2 also cannot be scheduled to the terminal 2, causing a waste of resources.

It may be understood that FIG. 5b shows only some RBGs in the BWP2.

Based on this, the embodiments may provide resource allocation methods to reduce generation of a resource fragment, thereby improving resource utilization.

The following describes the embodiments with reference to the accompanying drawings. In a description, unless otherwise specified, "/" indicates that associated objects are in an "or" relationship. For example, A/B may represent A or B. "And/or" is merely an association relationship describing associated objects and indicates that three relationships may exist. For example, A and/or B may represent the following three cases: only A exists, both A and B exist, and only B exists, where A and B may be singular or plural. In addition, in the descriptions, "a plurality of" means two or more than two. "At least one of the following items (pieces)"

or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, to clearly describe the embodiments, words such as "first" and "second" are used to distinguish between same items or similar items that have basically the same functions or purposes. A person skilled in the art may understand that the terms such as "first" and "second" do not limit a quantity or an execution sequence, and the terms such as "first" and "second" do not indicate a definite difference. In the embodiments, the word "example", "for example", or the like is used to represent giving an example, an illustration, or a description. Any embodiment described as an "example" or "for example" should not be explained as being more preferred or having more advantages than another embodiment. Use of the word "example", "for example", or the like is intended to present a related concept.

The embodiments may be applicable to an LTE system and an NR system, and may also be applicable to other wireless communication systems such as a global system for mobile communication (GSM), a mobile communication system (UMTS), a code division multiple access (CDMA) system, a wideband code division multiple access (WCDMA) system, a 5G network, and a future-oriented new network system. This is not limited in the embodiments. The foregoing communication systems are merely used as examples for description. A communication system is not limited. They are all described herein, and details are not described again below. The terms "system" and "network" can be interchanged with each other.

Figure 6:
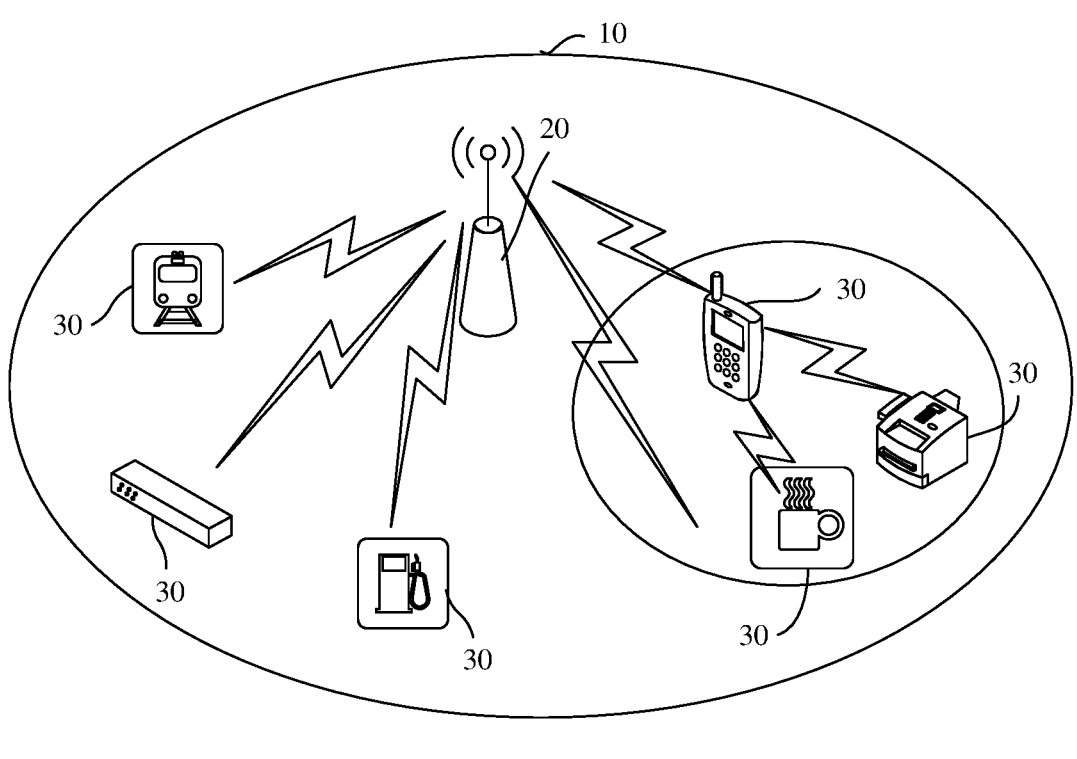
FIG. 6 is a schematic diagram of an architecture of a communication system according to an embodiment.

FIG. 6 shows a communication system 10 according to an embodiment. The communication system 10 includes a network device 20, and one or more terminal devices 30 connected to the network device 20. Optionally, different terminal devices 30 may communicate with each other.

For example, the network device 20 shown in FIG. 6 interacts with any terminal device 30. In this embodiment, the network device and the terminal device determine a bandwidth part allocated to the terminal device. The bandwidth part includes a first bandwidth part. The network device determines a first value and sends first indication information to the terminal device, so that the terminal device receives the first indication information. The first indication information is used to indicate the first value. The first value may be used to indicate an RBG size corresponding to the first bandwidth part. Correspondingly, after receiving the first indication information, the terminal device determines, based on the first value, the RBG size corresponding to the first bandwidth part. Alternatively, the first value may be used to determine an RIV set corresponding to the first bandwidth part. Correspondingly, after receiving the first indication information, the terminal device determines, based on the first value, the RIV set corresponding to the first bandwidth part.

Based on the solution, compared with that the RBG size corresponding to the first BWP is determined by searching a table in the conventional technology, in this embodiment, the RBG size corresponding to the first BWP may be controlled by the network device by using the first value. Therefore, the network device may adjust the RBG size corresponding to the first BWP, so that some RBGs in the first BWP are aligned with some RBGs in a second BWP, reducing occurrence of a case in which an RBG in the second BWP includes an RBG in the first BWP, further reducing generation of a resource fragment, and improving resource utilization.

Alternatively, compared with the conventional technology, in this embodiment, the network device may control, by using the first value, an RIV in the RIV set corresponding to the first BWP, so that a starting VRB in a VRB set determined based on the RIV in the RIV set is aligned with a starting or ending VRB in an RBG in a second BWP, and/or an ending VRB in the VRB set is aligned with a starting or ending VRB in an RBG in the second BWP. Subsequently, the network device may indicate the RIV in the RIV set to the terminal device, so that the starting VRB and/or ending VRB in the VRB set allocated to the terminal device in the first BWP meet/meets the foregoing alignment requirements/requirement, reducing occurrence of a case in which an RBG in the second BWP includes the VRB set in the first BWP, further reducing generation of a resource fragment, and improving resource utilization.

Optionally, the network device 20 in this embodiment is a device that enables the terminal device 30 to access a radio network, and may be an evolved NodeB (eNB) in long term evolution (LTE), a base station in a 5th generation (5G) network or a future evolved public land mobile network (PLMN), a broadband network service gateway (BNG), a convergence switch, or a non-3rd generation partnership project (3GPP) access device. Alternatively, the network device 20 in this embodiment of this application may be a radio controller in a cloud radio access network (CRAN), a transmission and reception point TRP), a device including a TRP, or the like. This is not limited in this embodiment. Optionally, the base station in this embodiment may include various forms of base stations, such as a macro base station, a micro base station (also referred to as a small cell), a relay station, and an access point. This is not limited in this embodiment.

In a possible manner, the network device 20 in this embodiment may alternatively be a central unit (CU) or a distributed unit (DU), or the network device may include a CU and a DU. A plurality of DUs may share one CU. One DU may be alternatively connected to a plurality of CUs. It may be understood that the base station is divided into the CU and the DU from the perspective of a logical function. The CU and the DU may be physically separate from each other or may be deployed together. This is not limited in this embodiment. The CU and the DU may be connected through an interface, for example, an F1 interface. The CU and the DU may be determined based on protocol layers of a radio network. For example, functions of an RRC protocol layer, a service data adaptation protocol stack (SDAP) protocol layer, and a packet data convergence protocol (PDCP) protocol layer are set in the CU, while functions of a radio link control (RLC) protocol layer, a media access control (MAC) protocol layer, a physical (PHY) protocol layer, and the like are set in the DU.

It may be understood that processing functions of the CU and the DU being determined based on protocol layers is merely an example and the processing functions of the CU and the DU may be alternatively determined in another manner.

For example, the CU or the DU may be determined to have more protocol layer functions. For example, the CU or the DU may alternatively have some processing functions of the protocol layers through division. Some functions of the RLC layer and functions of protocol layers above the RLC layer may be set in the CU and remaining functions of the RLC layer and functions of protocol layers below the RLC layer may be set in the DU. Functions of the CU or the DU may be alternatively determined based on a service type or another system requirement. For example, division is performed based on a latency, a function whose processing time needs to satisfy a latency requirement is disposed on the DU, and a function whose processing time does not need to satisfy the latency requirement is disposed on the CU. The CU may alternatively have one or more functions of the core network. One or more CUs may be disposed together or separately. For example, the CUs may be disposed on a network side for ease of centralized management. The DU may have a plurality of radio frequency functions. Alternatively, the radio frequency functions may be disposed remotely.

Optionally, the CU may include a CU control plane (CU-CP) and a CU user plane (CU-UP). The CU-CP and the CU-UP may be understood as being obtained after the CU is divided from a perspective of a logical function. The CU-CP and the CU-UP may be determined based on the protocol layers of the radio network. For example, functions of the RRC protocol layer and the PDCP protocol layer that corresponds to a signaling radio bearer (SRB) are set in the CU-CP, while functions of the PDCP protocol layer corresponding to a data radio bearer (DRB) are set in the CU-UP. In addition, the functions of the SDAP protocol layer may be alternatively set in the CU-UP.

Optionally, the terminal device 30 in this embodiment may be a device configured to implement a wireless communication function, for example, a terminal or a chip that may be used in a terminal. The terminal may be user equipment (UE), an access terminal, a terminal unit, a terminal station, a mobile station, a remote station, a remote terminal, a mobile device, a wireless communication device, a terminal agent, a terminal apparatus, or the like in an internet of things (IoT), a 5G network, or a future evolved PLMN. The access terminal may be a cellular phone, a cordless phone, a session initiation protocol (SIP) phone, a wireless local loop (WLL) station, a personal digital assistant (PDA), a handheld device or computing device with a wireless communication function or another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

Optionally, the network device 20 and the terminal device 30 in this embodiment may also be referred to as communication apparatuses, which may be general-purpose devices or dedicated devices. This is not limited in this embodiment.

Figure 7:
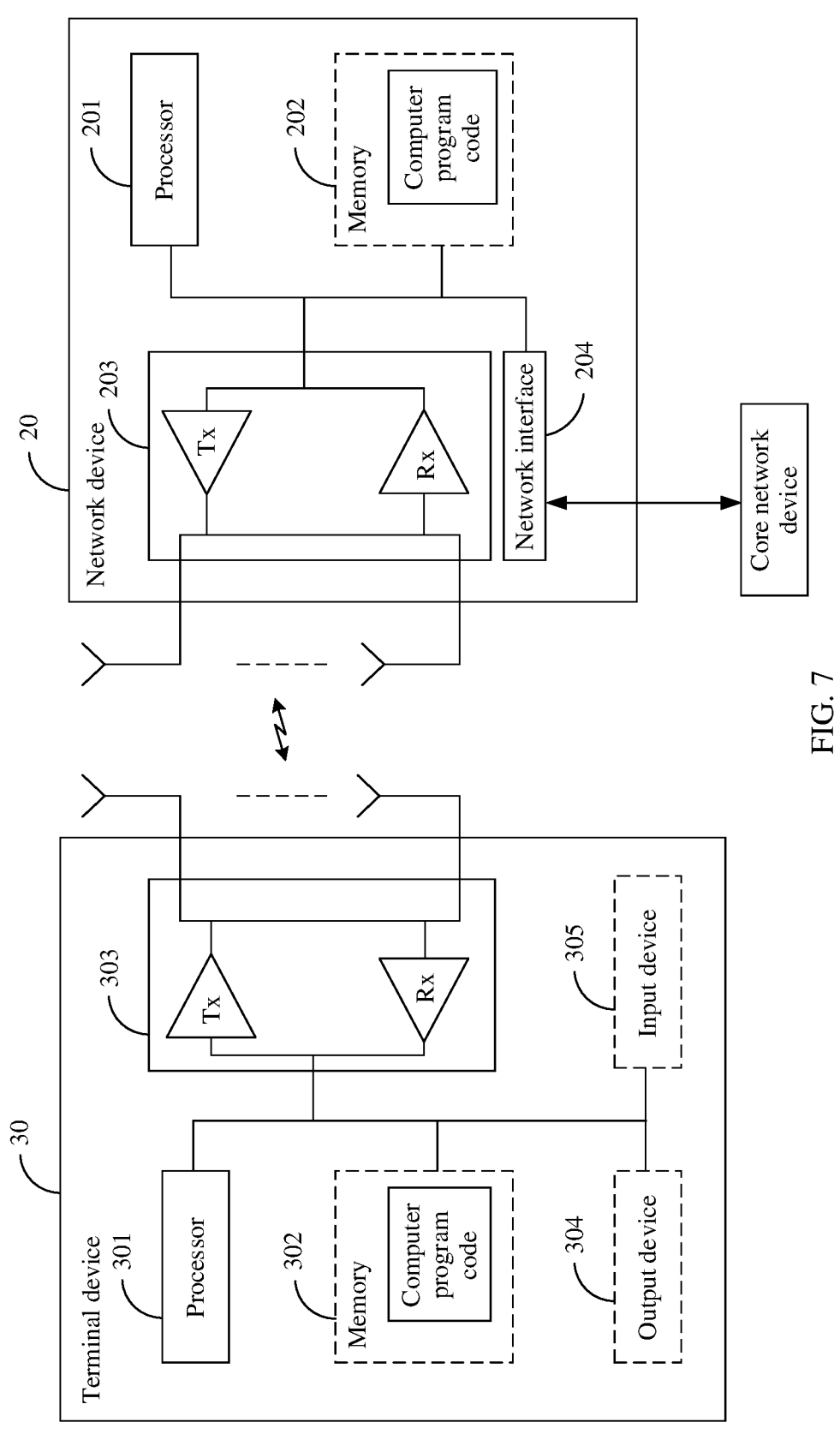
FIG. 7 is a schematic diagram of structures of a terminal device and a network device according to an embodiment.

Optionally, FIG. 7 is a schematic diagram of structures of a network device 20 and a terminal device 30 according to an embodiment.

The terminal device 30 includes at least one processor (in FIG. 7, an example in which one processor 301 is included is used for description) and at least one transceiver (in FIG. 7, an example in which one transceiver 303 is included is used for description). Optionally, the terminal device 30 may further include at least one memory (in FIG. 7, an example in which one memory 302 is included is used for description), at least one output device (in FIG. 7, an example in which one output device 304 is included is used for description), and at least one input device (in FIG. 7, an example in which one input device 305 is included is used for description).

The processor 301, the memory 302, and the transceiver 303 are connected to each other by a communication line. The communication line may include a path, which transports information between the components.

The processor 301 may be a general-purpose central processing unit (CPU), a microprocessor, an application-specific integrated circuit (ASIC), or one or more integrated circuits configured to control program execution. In an embodiment, the processor 301 may alternatively include a plurality of CPUs. The processor 301 may be a single-core (single-CPU) processor or a multi-core (multi-CPU) processor. The processor herein may refer to one or more devices, circuits, and/or processing cores configured to process data (for example, computer program instructions).

The memory 302 may be an apparatus with a storage function. For example, the memory 302 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 302 is not limited thereto. The memory 302 may exist independently and is connected to the processor 301 by using the communication line. Alternatively, the memory 302 may be integrated with the processor 301.

The memory 302 is configured to store computer-executable instructions for performing the solutions and the processor 301 controls execution. The processor 301 may be configured to execute the computer-executable instructions stored in the memory 302 to implement the communication methods in the embodiments.

Alternatively, optionally, in this embodiment, the processor 301 may perform processing-related functions in the communication methods provided in the following embodiments, and the transceiver 303 is responsible for communicating with another device or a communication network. This is not limited in this embodiment.

Optionally, the computer-executable instructions in this embodiment may also be referred to as application program code or computer program code. This is not limited in this embodiment.

The transceiver 303 may use any apparatus such as a transceiver, and is configured to communicate with another device or a communication network such as an Ethernet, a radio access network (RAN), or a wireless local area network (WLAN). The transceiver 303 includes a transmitter (Tx) and a receiver (Rx).

The output device 304 communicates with the processor 301, and may display information in a plurality of manners. For example, the output device 304 may be a liquid crystal display (LCD), a light emitting diode (LED) display device, a cathode ray tube (CRT) display device, or a projector.

The input device 305 communicates with the processor 301, and may receive a user input in a plurality of manners. For example, the input device 305 may be a mouse, a keyboard, a touchscreen device, or a sensor device.

The network device 20 includes at least one processor (in FIG. 7, an example in which one processor 201 is included is used for description), at least one transceiver (in FIG. 7, an example in which one transceiver 203 is included is used for description), and at least one network interface (in FIG. 7, an example in which one network interface 204 is included is used for description). Optionally, the network device 20 may further include at least one memory (in FIG. 7, an example in which one memory 202 is included is used for description). The processor 201, the memory 202, the transceiver 203, and the network interface 204 are connected to each other by a communication line. The network interface 204 is configured to be connected to a core network device by using a link (for example, an S1 interface), or to be connected to a network interface of another network device by using a wired or wireless link (for example, an X2 interface) (not shown in FIG. 7). This is not limited in this embodiment. In addition, for relevant descriptions of the processor 201, the memory 202, and the transceiver 203, refer to the descriptions of the processor 301, the memory 302, and the transceiver 303 in the terminal device 30. Details are not described herein again.

With reference to FIG. 1*a* to FIG. 7 and using an example in which the network device 20 shown in FIG. 6 interacts with any terminal device 30, the following describes in detail the resource allocation methods provided in the embodiments.

It may be understood that in the embodiments, the terminal device and/or the network device may perform some or all of steps in the embodiments. These steps or operations are merely examples. In the embodiments, other operations or variations of various operations may also be performed. In addition, the steps may be performed in different orders presented in the embodiments, and it may not be necessary to perform all operations in the embodiments.

It may be understood that in the embodiments, interaction between the network device and the terminal device may also be applicable to interaction between a CU and a terminal device or interaction between a DU and a terminal device. It may be understood that in the embodiments, a mechanism of interaction between the network device and the terminal device may be appropriately modified to be applicable to interaction between a CU or DU and a terminal device.

It should be noted that names of messages between network elements, names of parameters in the messages, or the like in the following embodiments are merely examples, and there may be other names during implementation. This is not limited in the embodiments.

It should be noted that a BWP in the following embodiments, including a first BWP, a second BWP, and a third BWP, may be a downlink BWP, and correspondingly, the resource allocation methods may be used for allocation of downlink resources; or the BWP may be an uplink BWP, and correspondingly, the resource allocation methods may be used for allocation of uplink resources.

In this embodiment, an example is used for description in which a first BWP of the terminal device is currently activated and the network device allocates a resource in the first BWP to the terminal device.

Figure 8:
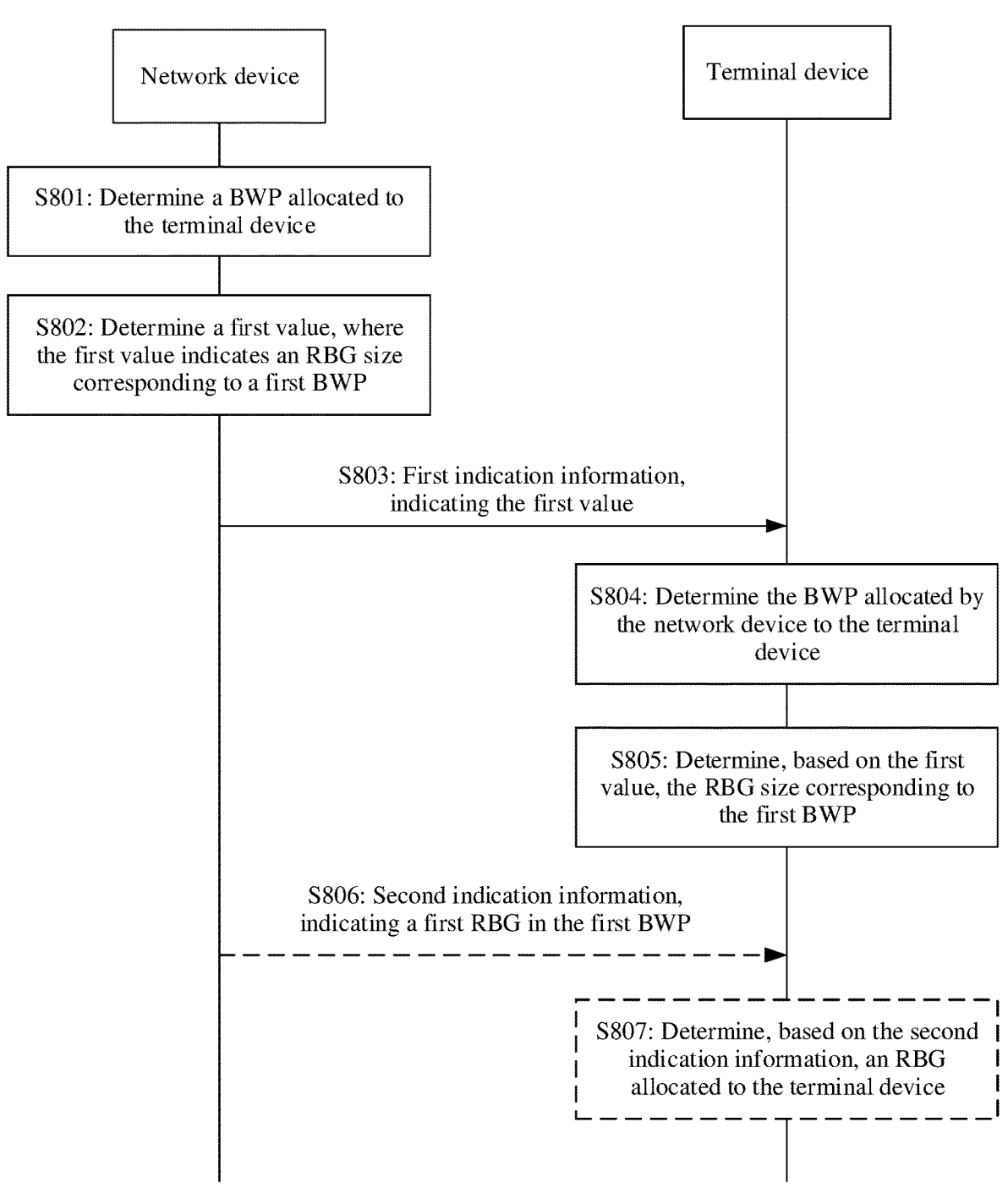
FIG. 8 is a schematic flowchart of a resource allocation method according to an embodiment.

The following is first described: a resource allocation method provided in an embodiment for a case in which a network device uses a type 0 for allocation of resources in a first BWP to a terminal device. As shown in FIG. 8, the resource allocation method includes the following steps.

S801: A network device determines a BWP allocated to a terminal device.

It may be understood that the network device may allocate one or more BWPs to the terminal device, and the one or more BWPs include a first BWP.

S802: The network device determines a first value.

The first value is used to indicate an RBG size corresponding to the first BWP. It may be understood that the RBG size corresponding to the first BWP is a nominal RBG size.

Optionally, the network device may determine the first value based on a nominal RBG size of a second BWP. Alternatively, the network device determines the nominal RBG size of the first BWP based on the nominal RBG size of the second BWP. The second BWP may be a currently activated BWP of another terminal device, and the network device currently also uses the type 0 for allocation of resources in the second BWP to the another terminal device. Alternatively, the second BWP may be an initial BWP of another terminal device. A type of the second BWP is not limited in this embodiment.

Optionally, there may be the following relationships between sizes of the first BWP and the second BWP.

In a possible implementation, the size of the second BWP is greater than the size of the first BWP, and the second BWP includes at least one part of the first BWP. For example, the second BWP includes all PRBs in the first BWP, that is, the first BWP is included in the second BWP. Alternatively, the second BWP includes some PRBs in the first BWP but does not include other PRBs in the first BWP, that is, the first BWP and the second BWP overlap. In this case, the terminal device with the first BWP currently activated may be understood as a narrowband terminal, and another terminal device with the second BWP currently activated may be understood as a wideband terminal. Optionally, the first value may be equal to the nominal RBG size corresponding to the second BWP. Alternatively, the first value may be equal to N times the nominal RBG size corresponding to the second BWP, where N is a positive integer greater than 1.

For example, the size of the second BWP is 270 PRBs, the size of the first BWP is 25 PRBs, and the first value is equal to the RBG size corresponding to the second BWP. It is assumed that a configuration 1 is used. The network device may determine according to Table 1 that the nominal RBG size corresponding to the second BWP is 16. In this case, the network device may determine the first value as 16, that is, the network device determines that the nominal RBG size corresponding to the first BWP is also 16.

In another possible implementation, the size of the second BWP is less than the size of the first BWP, and the first BWP includes at least one part of the second BWP. For example, the first BWP includes all PRBs in the second BWP, that is, the second BWP is included in the first BWP. Alternatively, the first BWP includes some PRBs in the second BWP but does not include other PRBs in the second BWP, that is, the first BWP and the second BWP overlap. In this case, the terminal device with the first BWP currently activated may be understood as a wideband terminal, and another terminal device with the second BWP currently activated may be understood as a narrowband terminal.

Optionally, the first value may be equal to the nominal RBG size corresponding to the second BWP. Alternatively, the first value may be equal to 1/N times the nominal RBG size corresponding to the second BWP, where N is a positive integer greater than 1.

For example, the size of the second BWP is 25 PRBs, the size of the first BWP is 270 PRBs, and the first value is equal to the RBG size corresponding to the second BWP. It is assumed that a configuration 1 is used. The network device may determine according to Table 1 that the nominal RBG size corresponding to the second BWP is 2. In this case, the network device may determine the first value as 2, that is, the network device determines that the nominal RBG size corresponding to the first BWP is also 2.

In the following embodiment, an example is used for description in which the size of the second BWP is greater than the size of the first BWP. It may be understood that the method in the following embodiment is also applicable when the size of the second BWP is less than the size of the first BWP.

Optionally, in step S801 described above, the BWP that the network device determines to allocate to the terminal device may further include a third BWP. That is, the network device may allocate a plurality of BWPs to the terminal device.

In an implementation scenario of this case, the network device may determine an RBG size corresponding to the third BWP to be the same as the RBG size corresponding to the first BWP. In this case, the first value may be further used to indicate the RBG size corresponding to the third BWP. That is, a plurality of BWPs (or a group of BWPs) of the terminal device correspond to one first value, or RBG sizes corresponding to a plurality of BWPs are configured by using the first value.

For example, it is assumed that the network device allocates four BWPs to the terminal device, namely, a BWP0, a BWP1, a BWP2, and a BWP3. If the first BWP is the BWP0 and the third BWP is the BWP1, the BWP2, and the BWP3, the first value may indicate RBG sizes corresponding to the BWP0 to the BWP3. Alternatively, if the first BWP is the BWP0 and the third BWP is the BWP1, the first value may indicate RBG sizes corresponding to the BWP0 and the BWP1. For RBG sizes corresponding to the BWP2 and the BWP3, the network device may indicate the RBG sizes by using a second value.

In other words, for a plurality of BWPs of the terminal device, the network device can indicate, by using one value, RBG sizes corresponding to the plurality of BWPs, reducing signaling overheads used for indicating, to the terminal device, the RBG sizes corresponding to the plurality of BWPs.

In another implementation scenario of this case, the network device may determine an RBG size corresponding to the third BWP to be different from the RBG size corresponding to the first BWP. In other words, the network device may configure a separate RBG size for each BWP.

For example, it is assumed that the network device allocates four BWPs to the terminal device, namely, a BWP0, a BWP1, a BWP2, and a BWP3. If the first BWP is the BWP0, the network device may configure an RBG size corresponding to the BWP0 to be the first value, configure an RBG size corresponding to the BWP1 to be a second value, configure an RBG size corresponding to the BWP2 to be a third value, and configure an RBG size corresponding to the BWP3 to be a fourth value.

In other words, for a plurality of BWPs of the terminal device, the network device may indicate, by using a plurality of values, RBG sizes corresponding to the plurality of BWPs, improving flexibility of configuration.

S803: The network device sends first indication information to the terminal device. Correspondingly, the terminal device receives the first indication information from the network device.

The first indication information is used to indicate the first value.

Optionally, the network device may send the first indication information to the terminal device in different manners.

In a possible implementation, the network device may send the first indication information to the terminal device by using higher layer signaling. For example, the network device may send a system message to the terminal device, where the system message includes the first indication information; or the network device may send radio resource control (RRC) signaling to the terminal device, where the RRC signaling includes the first indication information; or the network device may send a media access control control element (MAC CE) to the terminal device, where the MAC CE includes the first indication information.

In another possible implementation, the network device may send the first indication information to the terminal device by using physical layer signaling. For example, the network device may send downlink control information (DCI) to the terminal device, where the DCI includes the first indication information.

S804: The terminal device determines the BWP allocated by the network device to the terminal device.

It may be understood that the BWP allocated by the network device to the terminal device may include one or more BWPs, and the one or more BWPs include the first BWP.

It should be noted that step S804 and steps S802 and S803 are not necessarily performed in a particular order. Step S804 may be performed first, and then steps S802 and S803 are performed; or steps S802 and S803 may be performed first, and then step S804 is performed; or step S804 and steps S802 and S803 may be performed simultaneously.

S805: The terminal device determines, based on the first value, the RBG size corresponding to the first BWP.

Optionally, the terminal device may determine the first value as the RBG size corresponding to the first BWP.

Optionally, after determining the RBG size corresponding to the first BWP, the terminal device may determine RBGs in the first BWP by using the method described in the type 0 above.

For example, the size of the first BWP is 25 PRBs, the first value is 16, and a number $N_{BWP}^{start}$ a CRB corresponding to a starting PRB in the first BWP is 30. The terminal device may determine the RBG size of the first BWP as 16. Then, the terminal device determines a quantity of RBGs in the first BWP, a size of a first RBG, and a size of a last RBG. For example, the total quantity of RBGs in the first BWP: $N_{RBG}=\lceil (N_{BWP}^{size}+(N_{BWP}^{start} \bmod P))/P \rceil=\lceil (25+(30 \bmod 16))/16 \rceil=3$;

the size of the first RBG: $RBG_0^{size}=P-N_{BWP}^{start} \bmod P=16-30 \bmod 16=2$;

the size of the last RBG: $RBG_{last}^{size}=(N_{BWP}^{size}+N_{BWP}^{start}) \bmod P=(25+30) \bmod 16=7$; and sizes of other RBGs (that is, a second RBG) are 16.

For example, if the size of the second BWP is 270 PRBs and the configuration 1 is used, it can be obtained according to Table 1 that the RBG size corresponding to the second BWP is 16. Assuming that a number $N_{BWP}^{start}$ of a CRB corresponding to a starting PRB in the second BWP is 24, RBGs in the second BWP that are determined by using the method described in the type 0 above may be as follows:

a total quantity of RBGs: $N_{RBG}=\lceil (N_{BWP}^{size}+(N_{BWP}^{start} \bmod P))/P \rceil=\lceil (270+(24 \bmod 16))/16 \rceil=18$;

a size of a first RBG: $RBG_0^{size}=P-N_{BWP}^{start} \bmod P=16-24 \bmod 16=8$;

a size of a last RBG: $RBG_{last}^{size}=(N_{BWP}^{size}+N_{BWP}^{start}) \bmod P=(170+24) \bmod 16=6$; and sizes of other RBGs are 16.

Figure 9:
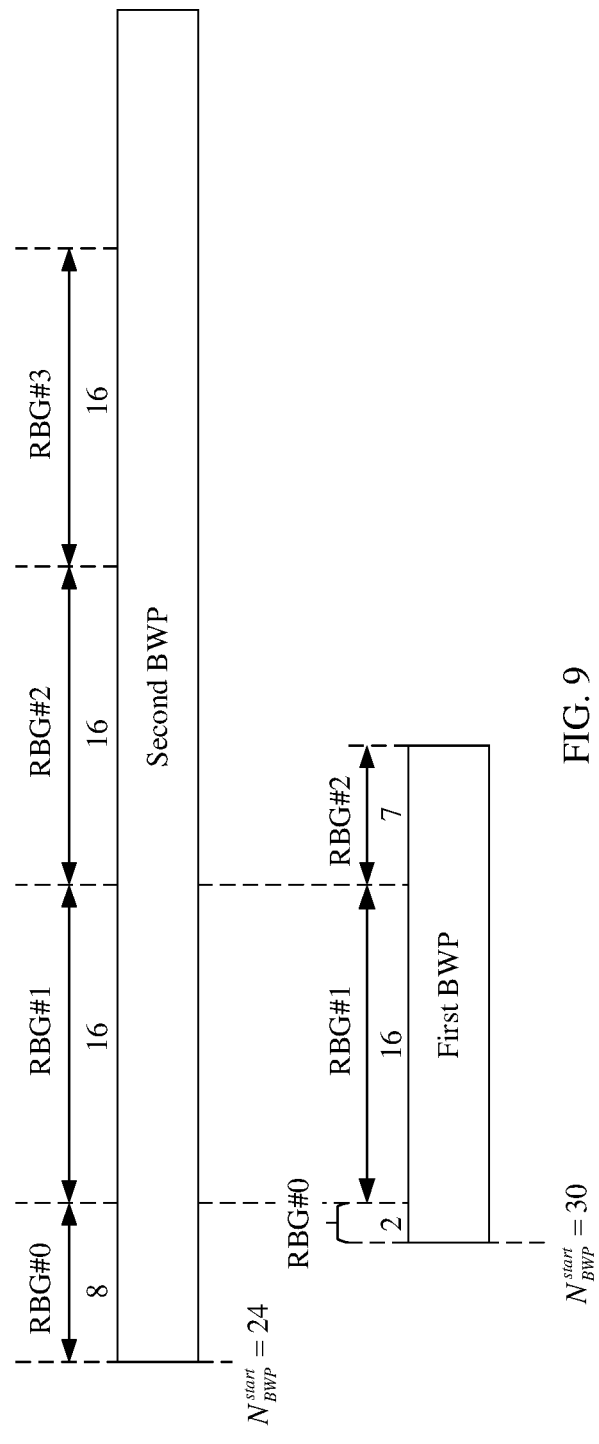
FIG. 9 is a schematic diagram 1 of resource allocation according to an embodiment.

Based on the foregoing examples, the first BWP and the second BWP may be shown in FIG. 9. It may be understood that FIG. 9 shows only some RBGs in the second BWP. It can be understood from FIG. 9 that a head and a tail of the RBG #1 in the first BWP are aligned with a head and a tail of an RBG #1 in the second BWP, respectively. Therefore, when the network device schedules the RBG #1 in the first BWP to the terminal device, there is no resource fragment in the RBG #1 in the second BWP.

It may be understood that if the configuration 1 is used, the RBG size that corresponds to the first BWP and that is determined based on Table 1 described above is 2. When RBGs in the first BWP are determined based on the size, the RBG #1 in the second BWP include a plurality of RBGs in the first BWP. As a result, when the network device allocates any one or more RBGs of the plurality of RBGs to the terminal device, there is a resource fragment in the RBG #1 in the second BWP, causing a waste of resources.

Optionally, when the network device indicates, by using one value, RBG sizes corresponding to a plurality of BWPs, the terminal device may determine the RBG sizes corresponding to the plurality of BWPs after receiving the first indication information. For example, when the first value is further used to indicate the RBG size corresponding to the third BWP, the terminal device further determines, based on the first value, the RBG size corresponding to the third BWP. For details, refer to the relevant description of the first BWP. Details are not described herein again. When the network device indicates, by using a plurality of values, RBG sizes corresponding to a plurality of BWPs, the network device may further send, to the terminal device, RBG sizes corresponding to other BWPs other than the first BWP.

According to the foregoing solution, compared with that the RBG size corresponding to the first BWP is determined by searching a table in the conventional technology, in this embodiment, the RBG size corresponding to the first BWP may be controlled by the network device. The network device may flexibly adjust the RBG size corresponding to the first BWP, so that some RBGs in the first BWP are aligned with some RBGs in the second BWP, reducing occurrence of a case in which an RBG in the second BWP includes an RBG in the first BWP, further reducing generation of a resource fragment, and improving resource utilization.

Optionally, as shown in FIG. 8, the resource allocation method may further include the following step.

S806: The network device sends second indication information to the terminal device. Correspondingly, the terminal device receives the second indication information from the network device.

The second indication information is used to indicate a first RBG. The first RBG is an RBG allocated to the terminal device in the first BWP.

Optionally, the second indication information is carried by a first field, and a bit quantity of the first field is determined based on the first value. For example, the bit quantity of the first field is the same as the total quantity that is of the RBGs in the first BWP and that is determined based on the first value.

Based on the example shown in FIG. 9, the bit quantity of the first field may be 3. If the network device allocates the RBG #1 in the first BWP to the terminal device, that is, the first RBG is the RBG #1 in the first BWP, the second indication information may be "010".

Based on the solution, compared with the conventional technology, because the RBG size corresponding to the first BWP increases, the total RBG quantity of the first BWP decreases, and therefore, the bit quantity of the first field decreases accordingly, reducing signaling overheads.

Optionally, the network device may send the second indication information to the terminal device by using the DCI. In other words, the network device sends the DCI to the terminal device, where the DCI includes the second indication information.

It should be noted that step S805 and step S806 are not necessarily performed in a particular order. Step S805 may be performed first, and then step S806 is performed; or step S806 may be performed first, and then step S805 is performed; or step S805 and step S806 may be performed simultaneously.

S807: The terminal device determines, based on the second indication information, the RBG allocated to the terminal device.

Optionally, the terminal device determines the first RBG indicated by the second indication information as the RBG allocated to the terminal device in the first BWP.

For example, based on the example shown in FIG. 9, if the second indication information is "010", the first RBG is the RBG #1 in the first BWP. In this case, the terminal device determines the RBG #1 in the first BWP as the RBG allocated by the network device to the terminal device.

At this point, the terminal device can determine, according to the method provided in this embodiment, a resource allocated by the network device to the terminal device, and therefore, can use the resource for transmission.

In the foregoing embodiment, the method is provided that the network device indicates, to the terminal device, the RBG size corresponding to the first BWP. In another implementation scenario, the network device may not indicate, to the terminal device, the RBG size corresponding to the first BWP. In this case, the RBG size corresponding to the first BWP may be a preset value or a value agreed on in a protocol. For example, when the size of the second BWP is greater than the size of the first BWP, the preset value or agreed value is equal to a maximum value of P in Table 1, that is, the RBG size corresponding to the first BWP is 16. Alternatively, when the size of the second BWP is less than the size of the first BWP, the preset value or agreed value is equal to a minimum value of P in Table 1, that is, the RBG size corresponding to the first BWP is 2.

Figure 10:
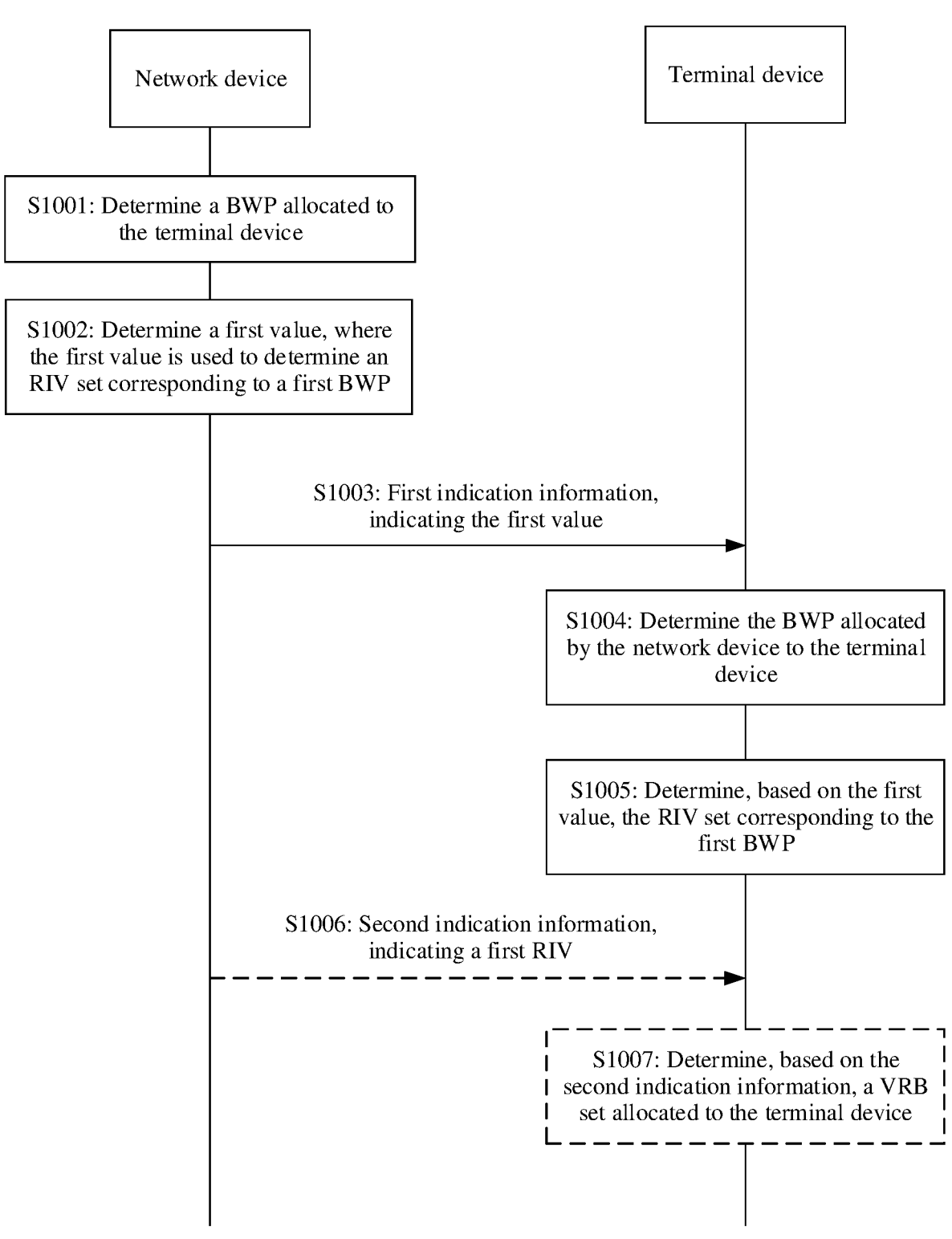
FIG. 10 is a schematic flowchart of another resource allocation method according to an embodiment.

The following describes a resource allocation method provided in an embodiment for a case in which a network device uses a type 1 for allocation of resources in a first BWP to a terminal device. As shown in FIG. 10, the resource allocation method includes the following steps.

S1001: A network device determines a BWP allocated to a terminal device.

Step S1001 is the same as step S801 in the embodiment shown in FIG. 8 described above. For details, refer to the relevant description in S801 described above. Details are not described herein again.

S1002: The network device determines a first value.

The first value is used to determine an RIV set corresponding to the first BWP.

Optionally, when a size of a second BWP is greater than a size of the first BWP, and the second BWP includes at least one part of the first BWP, the first value may be equal to a nominal RBG size corresponding to the second BWP. Alternatively, the first value may be equal to N times the nominal RBG size corresponding to the second BWP. When a size of a second BWP is less than a size of the first BWP, and the first BWP includes at least one part of the second BWP, the first value may be equal to a nominal RBG size corresponding to the second BWP. Alternatively, the first value may be equal to 1/N times the nominal RBG size corresponding to the second BWP, where N is a positive integer greater than 1. For a relevant description, refer to step S802 described above. Details are not described herein again.

In the following embodiment, an example is used for description in which the size of the second BWP is greater than the size of the first BWP. It may be understood that the method in the following embodiment is also applicable when the size of the second BWP is less than the size of the first BWP.

Optionally, a VRB set determined based on an RIV in the RIV set meets one or more of the following:

$$(N_{BWP}^{start}+RB_{start}) \bmod K=0 \text{ or } (N_{BWP}^{start}+RB_{start}+L_{RBs}) \bmod K=0,$$

where K is the first value, $RB_{start}$ is an index value of a starting VRB in the VRB set, $L_{RBs}$ is a quantity of VRBs included in the VRB set, and $N_{BWP}^{start}$ is a number of a CRB corresponding to a starting PRB in the first BWP.

It should be noted that the VRB set may include one or more VRBs. When the VRB set includes a plurality of VRBs, the plurality of VRBs may be contiguous.

It may be understood that when the first value is equal to the nominal RBG size corresponding to the second BWP or is equal to N times the nominal RBG size, the starting VRB included in the VRB set in the first BWP can be controlled, by using $(N_{BWP}^{start}+RB_{start}) \bmod K=0$, to be aligned with a starting or ending VRB in an RBG in the second BWP, and an ending VRB included in the VRB set can be controlled, by using $(N_{BWP}^{start}+RB_{start}+L_{RBs}) \bmod K=0$, to be aligned with a starting or ending VRB in an RBG in the second BWP.

For example, the size of the second BWP is 270 PRBs, a number $N_{BWP}^{start}$ of a CRB corresponding to a starting PRB in the second BWP is 24, the size of the first BWP is 25 PRBs, the number $N_{BWP}^{start}$ of the CRB corresponding to the starting PRB in the first BWP is 30, and the first value is equal to an RBG size corresponding to the second BWP. It is assumed that a configuration 1 is used. The network device may determine according to Table 1 that the nominal RBG size corresponding to the second BWP is 16. In this case, the network device may determine the first value as 16. Correspondingly, an index of the starting VRB in the VRB set meets $(30+RB_{start}) \bmod 16=0$. For example, the index of the starting VRB is 2 or 18. Alternatively, the index of the starting VRB and the quantity of VRBs in the VRB set meet $(30+RB_{start}+L_{RBs}) \bmod 16=0$. For example, the index of the starting VRB is 1, and the quantity of VRBs is 17, or the index of the starting VRB is 3, and the quantity of VRBs is 15.

Figure 11A:
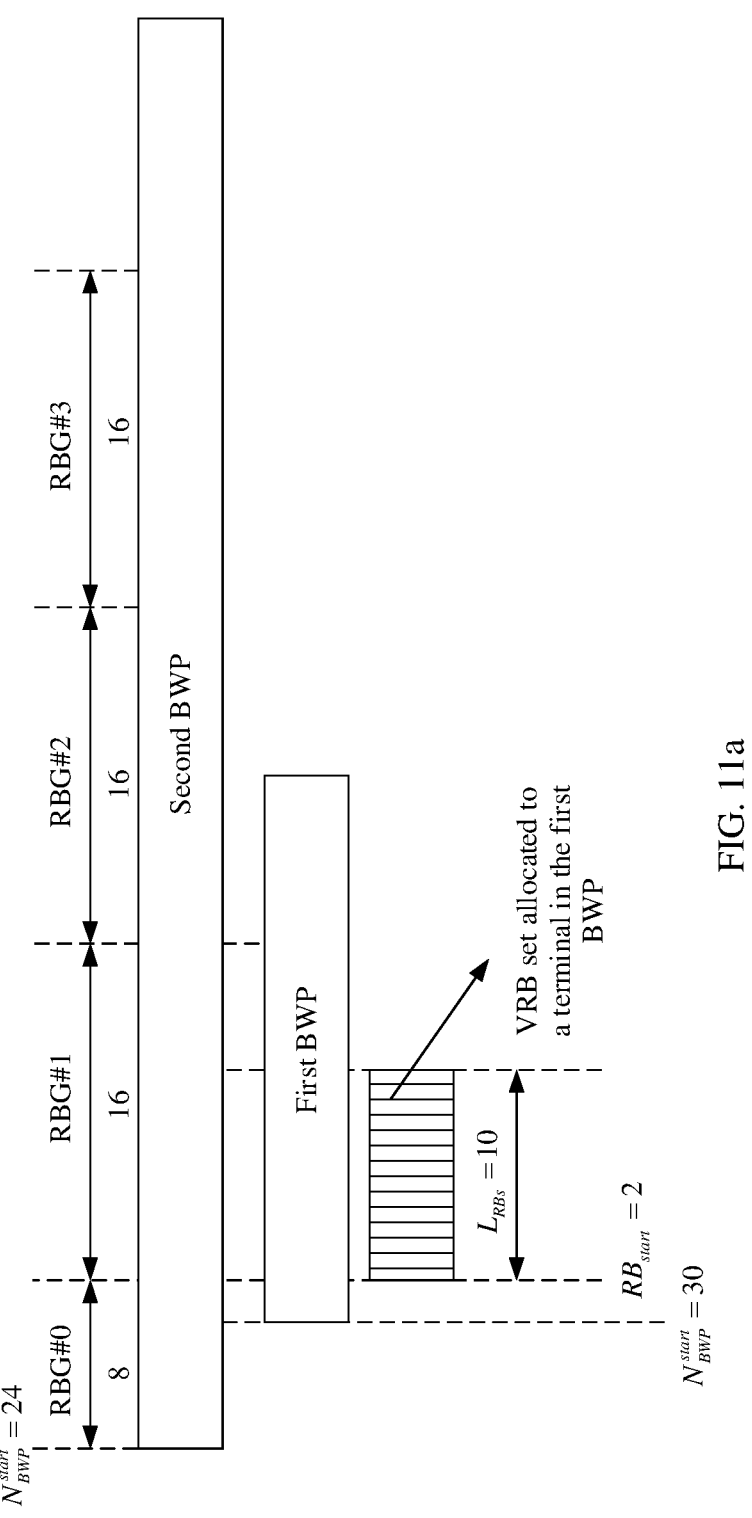
FIG. 11a is a schematic diagram 2 of resource allocation according to an embodiment.
Figure 11B:
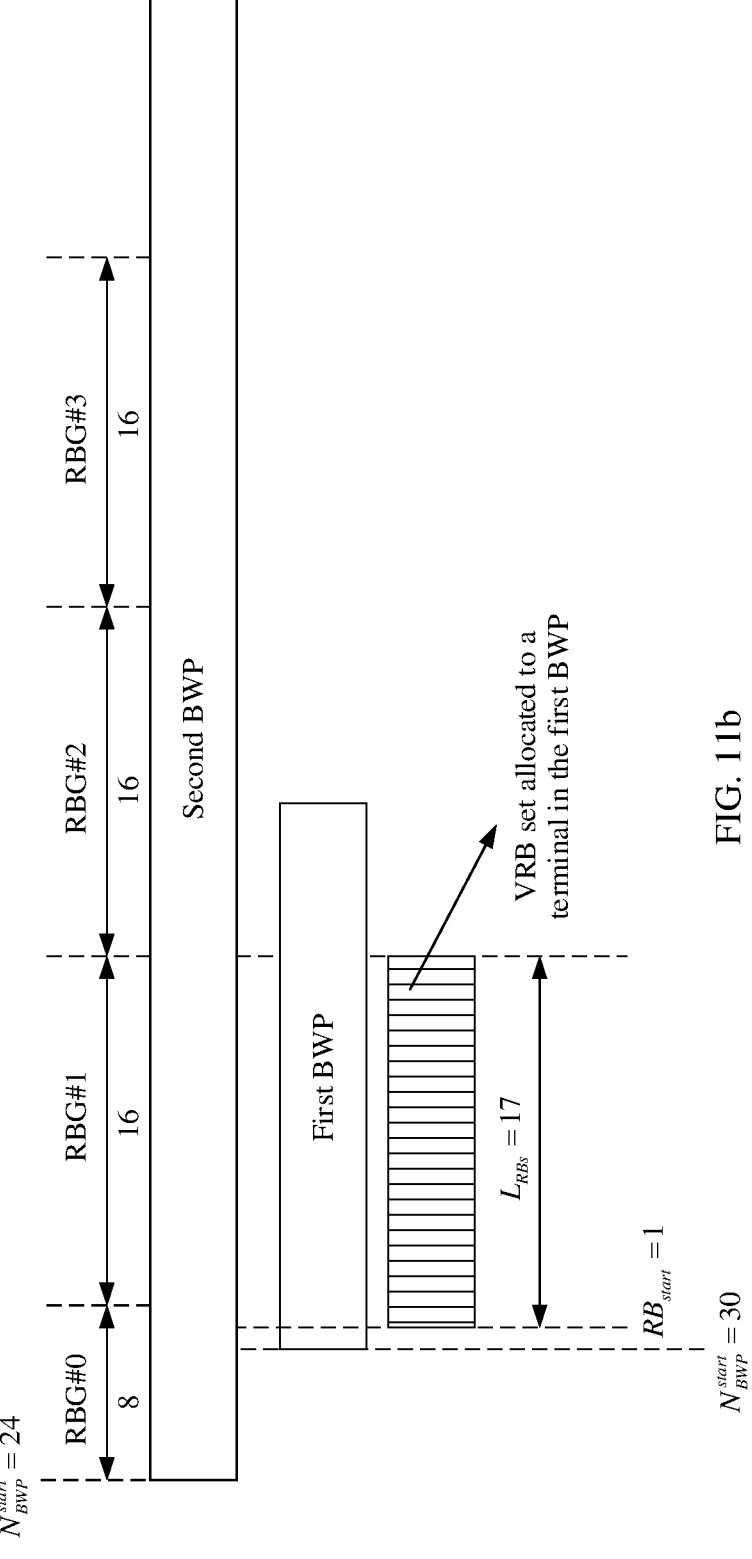
FIG. 11b is a schematic diagram 3 of resource allocation according to an embodiment.
Figure 11C:
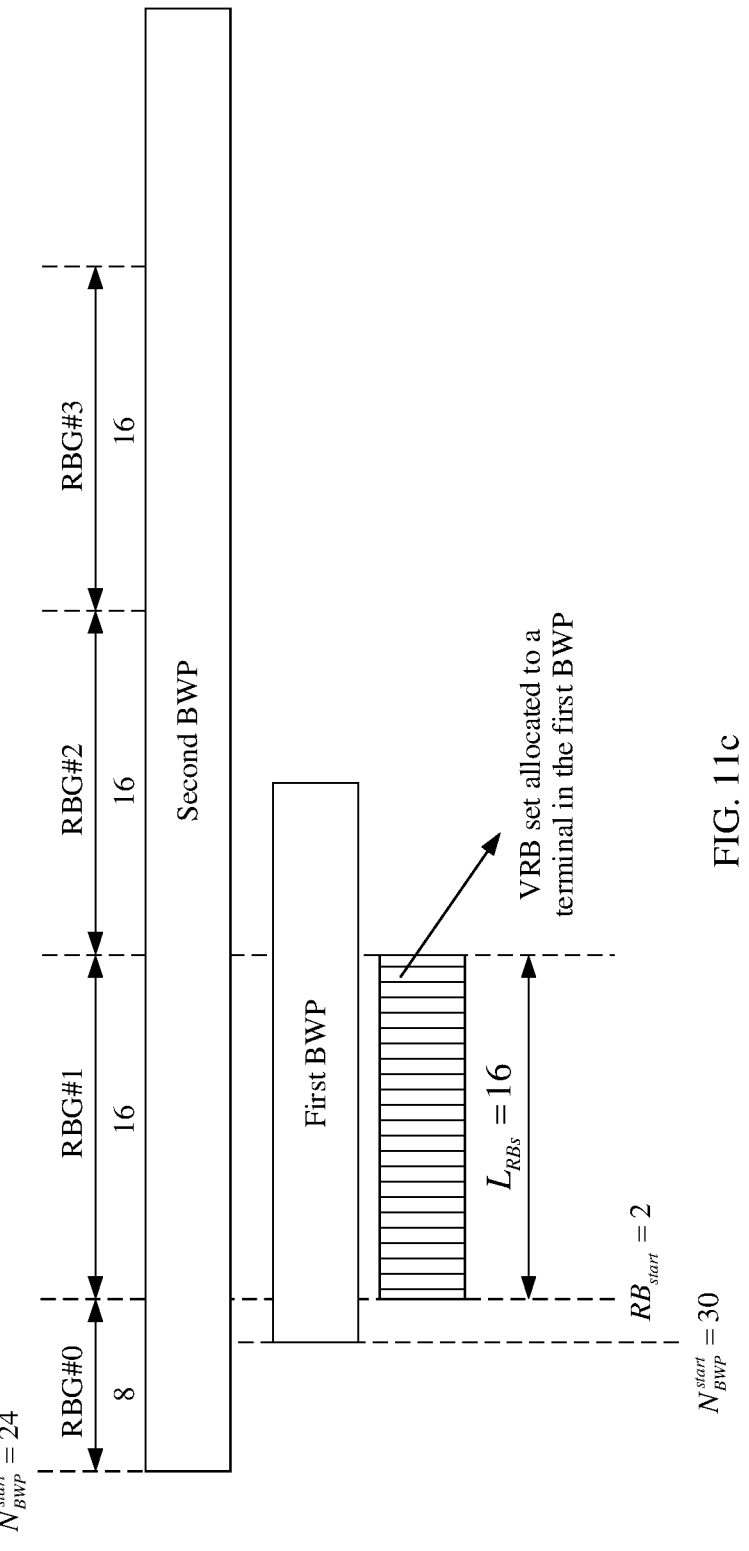
FIG. 11c is a schematic diagram 4 of resource allocation according to an embodiment.

For example, the index of the starting VRB in the VRB set meets $(30+RB_{start}) \bmod 16=0$, the index of the starting VRB is 2, and the quantity of VRBs is, for example, 10. As shown in FIG. 11a, the starting VRB included in the VRB set that is allocated to the terminal device and that is in the first BWP is aligned with a starting VRB in an RBG #1 in the second BWP. Alternatively, for example, the index of the starting VRB and the quantity of VRBs in the VRB set meet $(30+RB_{start}+L_{RBs}) \bmod 16=0$, the index of the starting VRB is 1, and the quantity of VRBs is 17. As shown in FIG. 11b, the ending VRB included in the VRB set that is allocated to the terminal device and that is in the first BWP is aligned with an ending VRB in an RBG #1 in the second BWP. Alternatively, for example, the index of the starting VRB in the VRB set meets $(30+RB_{start}) \bmod 16=0$, and the index of the starting VRB and the quantity of VRBs meet $(30+RB_{start}+L_{RBs})$ mod 16=0 For example, the index of the starting VRB is 2, and the quantity of VRBs is 16. As shown in FIG. 11c, the starting VRB included in the VRB set that is allocated to the terminal device and that is in the first BWP is aligned with a starting VRB in an RBG #1 in the second BWP, and the ending VRB in the VRB set is aligned with an ending VRB in an RBG #1 in the second BWP.

Optionally, after determining the first value, because the network device can determine a quantity of PRBs included in the first BWP and an index of the CRB corresponding to the starting PRB in the first BWP, the network device may traverse various possible starting VRBs and quantities of contiguous VRBs in the first BWP, to determine $RB_{start}$ and $L_{RBs}$ that meet the foregoing formulas, and then determine the RIV set based on $RB_{start}$ and $L_{RBs}$.

Optionally, it is assumed that the RIV set includes M RIVs. The network device may number the RIVs in order of RIV value. For example, the RIVs are numbered 0, 1, 2, . . . , and M−1 sequentially in ascending order.

Optionally, in step S1001 described above, the BWP that the network device determines to allocate to the terminal device may further include a third BWP. That is, the network device may allocate a plurality of BWPs to the terminal device.

In an implementation scenario of this case, the network device may determine that an RIV set corresponding to the third BWP is also determined based on the first value. In this case, the first value may be further used to determine the RIV set corresponding to the third BWP.

In other words, for a plurality of BWPs of the terminal device, the network device may indicate, by using one value, RIV sets corresponding to the plurality of BWPs, with no need to separately send, to the terminal device, values used for determining the RIV sets corresponding to the BWPs, further reducing signaling overheads.

In another implementation scenario of this case, the network device may determine that an RIV set corresponding to the third BWP is determined based on a second value.

In other words, the network device may configure different values for different BWPs to determine RIV sets corresponding to different BWPs, improving flexibility of configuration.

It should be noted that a method for determining the RIV set corresponding to the third BWP is similar to the method for determining the RIV set corresponding to the first BWP, and a difference lies in that when the RIV set corresponding to the third BWP is determined, the number of the CRB corresponding to the starting PRB in the first BWP in the foregoing formulas needs to be replaced with a number of a CRB corresponding to a starting PRB in the third BWP.

S1003: The network device sends first indication information to the terminal device. Correspondingly, the terminal device receives the first indication information from the network device.

Step S1003 is the same as step S803 in the embodiment shown in FIG. 8 described above. For details, refer to the relevant description in S803 described above. Details are not described herein again.

S1004: The terminal device determines the BWP allocated by the network device to the terminal device.

Step S1004 is the same as step S804 in the embodiment shown in FIG. 8 described above. For details, refer to the relevant description in S804 described above. Details are not described herein again.

S1005: The terminal device determines, based on the first value, the RIV set corresponding to the first BWP.

It may be understood that a method that the terminal device determines the RIV set corresponding to the first BWP is the same as the method that the network device determines the RIV set corresponding to the first BWP. For details, refer to the relevant description in step S1002 described above. Details are not described herein again.

Optionally, after determining the RIVs included in the RIV set, the terminal device may number the RIVs by using a same rule as that used by the network device. For example, the RIVs are numbered 0, 1, 2, . . . , and M−1 sequentially in ascending order.

Optionally, when the first value is further used to determine the RIV set corresponding to the third BWP, the terminal device further determines, based on the first value, the RIV set corresponding to the third BWP.

According to the foregoing solution, compared with the conventional technology, in this embodiment, the network device may control, by using the first value, an RIV in the RIV set corresponding to the first BWP, so that a starting VRB in a VRB set determined based on the RIV in the RIV set is aligned with a starting or ending VRB in an RBG in the second BWP, and/or an ending VRB in the VRB set is aligned with a starting or ending VRB in an RBG in the second BWP. Subsequently, the network device may indicate the RIV in the RIV set to the terminal device, so that the starting VRB and/or ending VRB in the VRB set allocated to the terminal device in the first BWP meet/meets the foregoing alignment requirements/requirement, reducing occurrence of a case in which an RBG in the second BWP includes the VRB set in the first BWP, further reducing generation of a resource fragment, and improving resource utilization.

Optionally, as shown in FIG. 10, the resource allocation method may further include the following step.

S1006: The network device sends second indication information to the terminal device. Correspondingly, the terminal device receives the second indication information from the network device.

The second indication information is used to indicate a first RIV. The first RIV is used to determine a virtual resource block VRB set that is allocated to the terminal device and that is in the first BWP.

Optionally, the second indication information may be a number or index of the first RIV.

Optionally, the second indication information is carried by a first field, and a bit quantity of the first field is determined based on the first value. For example, the bit quantity of the first field meets $\lceil \log_2 M \rceil$, where M is a total quantity of RIVs included in the RIV set corresponding to the first BWP, and M is determined based on the first value.

Based on the solution, because the RIVs included in the RIV set meet a condition in step S1002, compared with the conventional technology, a quantity of possible RIV values decreases, and therefore, a quantity of bits required to carry RIVs decreases accordingly, reducing signaling overheads.

Optionally, the network device may send the second indication information to the terminal device by using DCI. In other words, the network device sends the DCI to the terminal device, where the DCI includes the second indication information.

It should be noted that step S1005 and step S1006 are not necessarily performed in a particular order. Step S1005 may be performed first, and then step S1006 is performed; or step S1006 may be performed first, and then step S1005 is performed; or step S1005 and step S1006 may be performed simultaneously.

S1007: The terminal device determines, based on the second indication information, the VRB set allocated to the terminal device.

Optionally, the terminal device may determine, based on the RIV set corresponding to the first BWP and the second indication information, the VRB set corresponding to the first RIV indicated by the second indication information, as the VRB set that is allocated to the terminal device and that is in the first BWP.

For example, if the second indication information indicates the index of the first RIV, the terminal device may search, based on the index, the RIV set corresponding to the first BWP for a value of the first RIV. Then, the terminal device determines, based on the first RIV, a VRB set corresponding to the first RIV, and determines the VRB set as the VRB set that is allocated to the terminal device and that is in the first BWP. For a method that the terminal device determines, based on the first RIV, a VRB set corresponding to the first RIV, refer to the manner in a type 1 described above. Details are not described herein again.

At this point, the terminal device can determine, according to the method provided in this embodiment, a resource allocated by the network device to the terminal device, and therefore, can use the resource for transmission.

It may be understood that the foregoing methods may be applicable to a scenario in which the first BWP and the second BWP overlap, but the scenario shall not constitute any limitation. This may also be applicable to a scenario in which the first BWP and the second BWP do not overlap and/or a scenario in which a relationship between sizes of the first BWP and the second BWP is not limited, and is used to improve flexibility of resource allocation in the scenarios.

In the embodiment shown in FIG. 8 or FIG. 10 described above, actions of the network device may be performed by the network device 20 shown in FIG. 7, where the processor 201 in the network device 20 invokes the application program code stored in the memory 202 to instruct the network device to perform the actions. In the embodiment shown in FIG. 8 or FIG. 10 described above, actions of the terminal device may be performed by the terminal device 30 shown in FIG. 7, where the processor 301 in the terminal device 30 invokes the application program code stored in the memory 302 to instruct the terminal device to perform the actions. This is not limited in this embodiment.

In the embodiments, if there is no special description or a logical conflict, terms and/or descriptions in different embodiments are consistent and may be referenced to each other. Features in different embodiments may be combined to form a new embodiment based on an intrinsic logical relationship between the features.

It may be understood that in the foregoing embodiments, the methods and/or steps implemented by the terminal device may be alternatively implemented by a component (for example, a chip or a circuit) that may be used in the terminal device, and the methods and/or steps implemented by the network device may be alternatively implemented by a component that may be used in the network device.

The foregoing describes the solutions provided in the embodiments from the perspective of interaction between network elements. Correspondingly, an embodiment may further provide a communication apparatus. The communication apparatus is configured to implement the foregoing methods. The communication apparatus may be the terminal device in the foregoing method embodiments, or an apparatus including the terminal device, or a component that may be used in the terminal device. Alternatively, the communication apparatus may be the network device in the foregoing method embodiments, or an apparatus including the network device, or a component that may be used in the network device. It may be understood that, to implement the foregoing functions, the communication apparatus includes a corresponding hardware structure and/or software module for performing the functions. A person skilled in the art should be easily aware that units, algorithms, and steps in the examples described with reference to the embodiments can be implemented in a form of hardware or a combination of hardware and computer software. Whether a function is performed by hardware or hardware driven by computer software depends on a particular application. A person skilled in the art may use different methods to implement the described functions for each particular application, but it should not be considered that the implementation goes beyond the scope of the embodiments.

In this embodiment, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments, division into the modules is an example and is merely logical function division and may be other division in an actual implementation.

Figure 12:
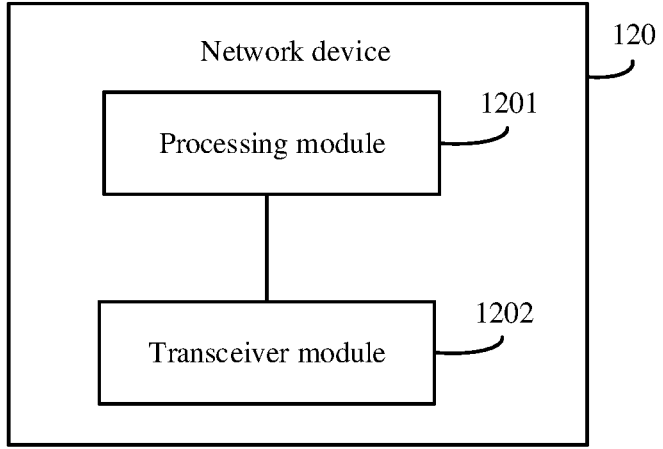
FIG. 12 is a schematic diagram of a structure of another network device according to an embodiment.

For example, the communication apparatus is the network device in the foregoing method embodiments. FIG. 12 is a schematic diagram of a structure of a network device 120. The network device 120 includes a processing module 1201 and a transceiver module 1202. The transceiver module 1202 may also be referred to as a transceiver unit, is configured to implement a transmission function and/or a reception function, and may be, for example, a transceiver circuit, a transceiver, or a communication interface.

The processing module 1201 is configured to determine a bandwidth part allocated to a terminal device, where the bandwidth part includes a first bandwidth part. The processing module 1201 is further configured to determine a first value, where the first value is used to indicate a resource block group RBG size corresponding to the first bandwidth part, or the first value is used to determine a resource indication value RIV set corresponding to the first bandwidth part. The transceiver module 1202 is configured to send first indication information to the terminal device, where the first indication information is used to indicate the first value.

Optionally, the transceiver module 1202 is further configured to send second indication information to the terminal device. When the first value is used to indicate the RBG size corresponding to the first bandwidth part, the second indication information is used to indicate a first RBG, where the first RBG is an RBG that is allocated to the terminal device and that is in the first bandwidth part. When the first value is used to determine the RIV set corresponding to the first bandwidth part, the second indication information is used to indicate a first RIV in the RIV set, where the first RIV is used to determine a virtual resource block VRB set that is allocated to the terminal device and that is in the first bandwidth part.

Optionally, that the transceiver module 1202 is configured to send first indication information to the terminal device may include: The transceiver module 1202 is configured to send a system message to the terminal device, where the system message includes the first indication information; or the transceiver module 1202 is configured to send radio resource control RRC signaling to the terminal device, where the RRC signaling includes the first indication information; or the transceiver module 1202 is configured to send a media access control control element (MAC CE) to the terminal device, where the MAC CE includes the first indication information; or the transceiver module 1202 is configured to send downlink control information DCI to the terminal device, where the DCI includes the first indication information.

All related content of the steps in the method embodiments may be cited in function descriptions of corresponding functional modules. Details are not described herein again.

In this embodiment, the network device 120 is presented in a form of obtaining each functional module through division in an integrated manner. The "module" herein may be an ASIC, a circuit, a processor, and a memory that execute one or more software or firmware programs, an integrated logic circuit, and/or another component that can provide the foregoing functions. In a simple embodiment, a person skilled in the art may figure out that the network device 120 may be in a form of the network device 20 shown in FIG. 7.

For example, the processor 201 in the network device 20 shown in FIG. 7 may invoke the computer-executable instructions stored in the memory 202, so that the network device 20 performs the resource allocation methods in the foregoing method embodiments.

Functions/implementation processes of the processing module 1201 and the transceiver module 1202 in FIG. 12 may be implemented by the processor 201 in the network device 20 shown in FIG. 7 invoking the computer-executable instructions stored in the memory 202. Alternatively, a function/implementation process of the processing module 1201 in FIG. 12 may be implemented by the processor 201 in the network device 20 shown in FIG. 7 invoking the computer-executable instructions stored in the memory 202, and a function/implementation process of the transceiver module 1202 in FIG. 12 may be implemented by the transceiver 203 in the network device 20 shown in FIG. 7.

Because the network device 120 provided in this embodiment may perform the foregoing resource allocation methods, for effects that can be obtained by the network device 120, refer to the foregoing method embodiments. Details are not described herein again.

Figure 13:
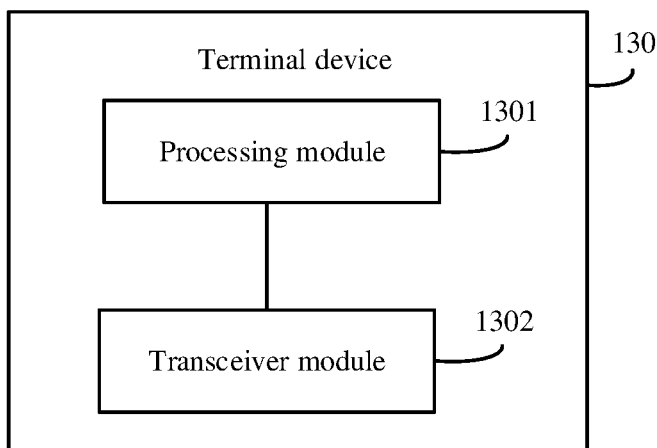
FIG. 13 is a schematic diagram of a structure of another terminal device according to an embodiment.

Alternatively, for example, the communication apparatus is the terminal device in the foregoing method embodiments. FIG. 13 is a schematic diagram of a structure of a terminal device 130. The terminal device 130 includes a processing module 1301 and a transceiver module 1302. The transceiver module 1302 may also be referred to as a transceiver unit, is configured to implement a transmission function and/or a reception function, and may be, for example, a transceiver circuit, a transceiver, a transceiver, or a communication interface.

The processing module 1301 is configured to determine a bandwidth part allocated by a network device to the terminal device, where the bandwidth part includes a first bandwidth part. The transceiver module 1302 is configured to receive first indication information from the network device, where the first indication information is used to indicate a first value. The processing module 1301 is further configured to determine, based on the first value, a resource block group RBG size corresponding to the first bandwidth part. Alternatively, the processing module 1301 is further configured to determine, based on the first value, a resource indication value RIV set corresponding to the first bandwidth part.

Optionally, the transceiver module 1302 is further configured to receive second indication information from the network device. The processing module 1301 is further configured to determine, based on the RBG size corresponding to the first bandwidth part and the second indication information, a first RBG indicated by the second indication information as an RBG that is allocated to the terminal device and that is in the first bandwidth part. Alternatively, the processing module 1301 is further configured to determine, based on the RIV set corresponding to the first bandwidth part and the second indication information, a VRB set corresponding to a first RIV that is indicated by the second indication information, as a VRB set that is allocated to the terminal device and that is in the first bandwidth part.

Optionally, the processing module 1301 is further configured to determine, based on the first value, an RBG size corresponding to a third bandwidth part. Alternatively, the processing module 1301 is further configured to determine, based on the first value, an RIV set corresponding to a third bandwidth part.

Optionally, that the transceiver module 1302 is configured to receive first indication information from the network device may include: The transceiver module 1302 is configured to receive a system message from the network device, where the system message includes the first indication information; or the transceiver module 1302 is configured to receive radio resource control RRC signaling from the network device, where the RRC signaling includes the first indication information; or the transceiver module 1302 is configured to receive a media access control control element (MAC CE) from the network device, where the MAC CE includes the first indication information; or the transceiver module 1302 is configured to receive downlink control information DCI from the network device, where the DCI includes the first indication information.

All related content of the steps in the method embodiments may be cited in function descriptions of corresponding functional modules. Details are not described herein again.

In this embodiment, the terminal device 130 is presented in a form of obtaining each functional module through division in an integrated manner. The "module" herein may be an ASIC, a circuit, a processor, and a memory that execute one or more software or firmware programs, an integrated logic circuit, and/or another component that can provide the foregoing functions. In a simple embodiment, a person skilled in the art may figure out that the terminal device 130 may be in a form of the terminal device 30 shown in FIG. 7.

For example, the processor 301 in the terminal device 30 shown in FIG. 7 may invoke the computer-executable instructions stored in the memory 302, so that the terminal device 30 performs the resource allocation methods in the foregoing method embodiments.

Functions/implementation processes of the processing module 1301 and the transceiver module 1302 in FIG. 13 may be implemented by the processor 301 in the terminal device 30 shown in FIG. 7 invoking the computer-executable instructions stored in the memory 302. Alternatively, a function/implementation process of the processing module 1301 in FIG. 13 may be implemented by the processor 301 in the terminal device 30 shown in FIG. 7 invoking the computer-executable instructions stored in the memory 302, and a function/implementation process of the transceiver module 1302 in FIG. 13 may be implemented by the transceiver 303 in the terminal device 30 shown in FIG. 7.

Because the terminal device 130 provided in this embodiment may perform the foregoing resource allocation methods, for effects that can be obtained by the terminal device 130, refer to the foregoing method embodiments. Details are not described herein again.

Optionally, an embodiment may further provide a communication apparatus (for example, the communication apparatus may be a chip or a chip system). The communication apparatus includes a processor, configured to implement the method in any one of the foregoing method embodiments. The communication apparatus may further include a memory. The memory is configured to store necessary program instructions and necessary data. The processor may invoke program code stored in the memory, to indicate the communication apparatus to perform the method in any one of the foregoing method embodiments. The communication apparatus may not include a memory.

The communication apparatus further includes an interface circuit. The interface circuit is a code/data read-write interface circuit. The interface circuit is configured to receive computer-executable instructions (the computer-executable instructions are stored in a memory, and may be read directly from the memory or by using another device) and transmit the computer-executable instructions to the processor. When the communication apparatus is a chip system, the communication apparatus may include a chip, or may include a chip and another discrete component. This is not limited in this embodiment.

All or some of the foregoing embodiments may be implemented by using software, hardware, firmware, or any combination thereof. When a software program is configured to implement the embodiments, all or some of the embodiments may be implemented in a form of a computer program product. The computer program product includes one or more computer instructions. When the computer program instructions are loaded and executed on a computer, the procedure or functions according to the embodiments are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments, the computer may include the apparatus described above.

Although described with reference to the embodiments, a person skilled in the art may understand and implement another variation of the disclosed embodiments by viewing the appended drawings and embodiments. Additionally, a single processor or another unit may implement several functions enumerated in the embodiments.

Although described with reference to all the embodiments thereof, it is clear that various modifications and combinations may be made to them without departing from the spirit and scope of the embodiments. Correspondingly, the embodiments and drawings are merely examples, and are considered as any or all of modifications, variations, combinations or equivalents. It is clear that a person skilled in the art can make various modifications and variations without departing from the spirit and scope of the embodiments and their equivalent technologies.

What is claimed is:

1. A resource allocation method, comprising:
determining, by a network device, a bandwidth part allocated to a terminal device, wherein the bandwidth part comprises a first bandwidth part;
determining, by the network device, a first value, wherein the first value is used to indicate a resource block group (RBG) size corresponding to the first bandwidth part, or the first value is used to determine a resource indication value (RIV) set corresponding to the first bandwidth part; and
sending, by the network device, first indication information to the terminal device, wherein the first indication information is used to indicate the first value,
wherein when the first value is used to determine the resource indication value RIV set corresponding to the first bandwidth part, the VRB set determined based on the RIV in the RIV set meets one or more of the following:

$$(N_{BWP}^{start}+RB_{start}) \bmod K=0, \text{ or } (N_{BWP}^{start}+RB_{start}+L_{RBs}) \bmod K=0, \text{ wherein}$$

K is the first value, $RB_{start}$ is an index value of a starting VRB in the VRB set, $L_{RBs}$ is a quantity of VRBs comprised in the VRB set, and $N_{BWP}^{start}$ is a number of a CRB corresponding to a starting PRB in the first bandwidth part.

2. The resource allocation method according to claim 1, wherein the first value is equal to an RBG size corresponding to a second bandwidth part, the second bandwidth part comprises at least one part of the first bandwidth part, and a size of the second bandwidth part is greater than a size of the first bandwidth part.

3. The resource allocation method according to claim 1, further comprising:
sending, by the network device, second indication information to the terminal device, wherein
when the first value is used to indicate the RBG size corresponding to the first bandwidth part, the second indication information is used to indicate a first RBG, and the first RBG is an RBG that is allocated to the terminal device and that is in the first bandwidth part; or
when the first value is used to determine the RIV set corresponding to the first bandwidth part, the second indication information is used to indicate a first RIV in the RIV set, and the first RIV is used to determine a virtual resource block (VRB) set that is allocated to the terminal device and that is in the first bandwidth part.

4. The resource allocation method according to claim 3, wherein the second indication information is carried by a first field, and a bit quantity of the first field is determined based on the first value.

5. A resource allocation method, comprising:

determining, by a terminal device, a bandwidth part allocated by a network device to the terminal device, wherein the bandwidth part comprises a first bandwidth part;

receiving, by the terminal device, first indication information from the network device, wherein the first indication information is used to indicate a first value;

determining, by the terminal device based on the first value, a resource block group (RBG) size corresponding to the first bandwidth part; or determining, by the terminal device based on the first value, a resource indication value (RIV) set corresponding to the first bandwidth part, wherein the VRB set determined based on the RIV in the RIV set meets one or more of the following:

$$(N_{BWP}^{start}+RB_{start})\bmod K=0, \text{ or } (N_{BWP}^{start}+RB_{start}+L_{RBs})\bmod K=0, \text{ wherein}$$

K is the first value, $RB_{start}$ is an index value of a starting VRB in the VRB set, $L_{RBs}$ is a quantity of VRBs comprised in the VRB set, and $N_{BWP}^{start}$ is a number of a CRB corresponding to a starting PRB in the first bandwidth part.

6. The resource allocation method according to claim 5, wherein the first value is equal to an RBG size corresponding to a second bandwidth part, the second bandwidth part comprises at least one part of the first bandwidth part, and a size of the second bandwidth part is greater than a size of the first bandwidth part.

7. The resource allocation method according to claim 5, further comprising:

receiving, by the terminal device, second indication information from the network device;

determining, by the terminal device based on the RBG size corresponding to the first bandwidth part and the second indication information, a first RBG indicated by the second indication information as an RBG that is allocated to the terminal device and that is in the first bandwidth part; or determining, by the terminal device based on the RIV set corresponding to the first bandwidth part and the second indication information, a VRB set corresponding to a first RIV that is indicated by the second indication information, as a VRB set that is allocated to the terminal device and that is in the first bandwidth part.

8. The resource allocation method according to claim 7, wherein the second indication information is carried by a first field, and a bit quantity of the first field is determined based on the first value.

9. A communication apparatus comprising:

at least one processor; and at least one memory coupled to the processor and storing instructions that, when the instructions are performed by the at least one processor, cause the apparatus to:

determine a bandwidth part allocated to a terminal device, wherein the bandwidth part comprises a first bandwidth part;

determine a first value, wherein the first value is used to indicate a resource block group (RBG) size corresponding to the first bandwidth part, or the first value is used to determine a resource indication value (RIV) set corresponding to the first bandwidth part; and send first indication information to the terminal device, wherein the first indication information is used to indicate the first value, wherein when the first value is used to determine the resource indication value (RIV) set corresponding to the first bandwidth part, the VRB set determined based on the RIV in the RIV set meets one or more of the following:

$$(N_{BWP}^{start}+RB_{start})\bmod K=0, \text{ or } (N_{BWP}^{start}+RB_{start}+L_{RBs})\bmod K=0, \text{ wherein}$$

K is the first value, $RB_{start}$ is an index value of a starting VRB in the VRB set, $LR_{RBs}$ is a quantity of VRBs comprised in the VRB set, and $N_{BWP}^{start}$ is a number of a CRB corresponding to a starting PRB in the first bandwidth part.

10. The communication apparatus according to claim 9, wherein the instructions further cause the communication apparatus to send second indication information to the terminal device, wherein when the first value is used to indicate the RBG size corresponding to the first bandwidth part, the second indication information is used to indicate a first RBG, and the first RBG is an RBG that is allocated to the terminal device and that is in the first bandwidth part; or when the first value is used to determine the RIV set corresponding to the first bandwidth part, the second indication information is used to indicate a first RIV in the RIV set, and the first RIV is used to determine a virtual resource block (VRB) set that is allocated to the terminal device and that is in the first bandwidth part.

11. The communication apparatus according to claim 9, wherein the bandwidth part further comprises a third bandwidth part, wherein the first value is further used to indicate an RBG size corresponding to the third bandwidth part; or the first value is further used to determine an RIV set corresponding to the third bandwidth part.

12. The communication apparatus according to claim 9, wherein the instructions further cause the communication apparatus to:

send a system message to the terminal device, wherein the system message comprises the first indication information;

send radio resource control (RRC) signaling to the terminal device, wherein the RRC signaling comprises the first indication information;

send a media access control element (MAC CE) to the terminal device, wherein the MAC CE comprises the first indication information; or send downlink control information (DCI) to the terminal device, wherein the DCI comprises the first indication information.

13. A communication apparatus comprising:

at least one processor; and at least one memory coupled to the processor and storing instructions that, when the instructions are performed by the at least one processor, cause the apparatus to:

determine a bandwidth part allocated by a network device to the communication apparatus, wherein the bandwidth part comprises a first bandwidth part;

receive first indication information from the network device, wherein the first indication information is used to indicate a first value;

determine, based on the first value, a resource block group RBG size corresponding to the first bandwidth part; or determine, based on the first value, a resource indication value RIV set corresponding to the first bandwidth part, wherein the VRB set determined based on the RIV in the RIV set meets one or more of the following:

$$(N_{BWP}^{start}+RB_{start})\bmod K=0, \text{ or } (N_{BWP}^{start}+RB_{start}+L_{RBs})\bmod K=0, \text{ wherein}$$

K is the first value, $RB_{start}$ is an index value of a starting VRB in the VRB set, $L_{RBs}$ is a quantity of VRBs comprised in the VRB set, and $N_{BWP}^{start}$ is a number of a CRB corresponding to a starting PRB in the first bandwidth part.

14. The communication apparatus according to claim 13, wherein the instructions further cause the communication apparatus to:

receive second indication information from the network device; and determine, based on the RBG size corresponding to the first bandwidth part and the second indication information, a first RBG indicated by the second indication information as an RBG that is allocated to the communication apparatus and that is in the first bandwidth part; or determine, based on the RIV set corresponding to the first bandwidth part and the second indication information, a VRB set corresponding to a first RIV that is indicated by the second indication information, as a VRB set that is allocated to the communication apparatus and that is in the first bandwidth part.

15. The communication apparatus according to claim 13, wherein the bandwidth part further comprises a third bandwidth part, wherein the processing module is further configured to determine, based on the first value, an RBG size corresponding to the third bandwidth part; or the processing module is further configured to determine, based on the first value, an RIV set corresponding to the third bandwidth part.

16. The communication apparatus according to claim 13, wherein the instructions further cause the communication apparatus to:

receive a system message from the network device, wherein the system message comprises the first indication information;

receive radio resource control RRC signaling from the network device, wherein the RRC signaling comprises the first indication information;

receive a media access control element (MAC CE) from the network device, wherein the MAC CE comprises the first indication information; or receive downlink control information (DCI) from the network device, wherein the DCI comprises the first indication information.

* * * * *